(12) United States Patent
Shaga et al.

(10) Patent No.: US 11,898,887 B2
(45) Date of Patent: Feb. 13, 2024

(54) SENSE COIL FOR INDUCTIVE ROTATIONAL-POSITION SENSING, AND RELATED DEVICES, SYSTEMS, AND METHODS

(71) Applicant: Microchip Technology Incorporated, Chandler, AZ (US)

(72) Inventors: Ganesh Shaga, Telangana (IN); Sudheer Puttapudi, Telangana (IN); Surendra Akkina, Telangana (IN)

(73) Assignee: Microchip Technology Incorporated, Chandler, AZ (US)

( * ) Notice: Subject to any disclaimer, the term of this patent is extended or adjusted under 35 U.S.C. 154(b) by 91 days.

(21) Appl. No.: 17/303,675

(22) Filed: Jun. 4, 2021

(65) Prior Publication Data
US 2022/0307868 A1  Sep. 29, 2022

Related U.S. Application Data

(60) Provisional application No. 63/200,751, filed on Mar. 25, 2021.

(51) Int. Cl.
G01D 5/20 (2006.01)
(52) U.S. Cl.
CPC .................... G01D 5/204 (2013.01)
(58) Field of Classification Search
CPC . G01D 5/00; G01D 5/20; G01D 5/204; G01P 3/488; G01R 27/267; G01V 3/10;
(Continued)

(56) References Cited

U.S. PATENT DOCUMENTS 1,639,044 A  8/1927 Mansbridge
3,197,763 A  7/1965 Fisher
(Continued)

FOREIGN PATENT DOCUMENTS

DE    4021637 A1   1/1992
DE   10120822 A1   4/2002
(Continued)

OTHER PUBLICATIONS

Microchip Technology Inc., "Inductive Sensor Interface IC with Embedded MCU", Summary Data Sheet LX3302A, DS20006496A (Feb. 2020) 48 pages.
(Continued)

Primary Examiner — Son T Le
(74) Attorney, Agent, or Firm — TraskBritt

(57) ABSTRACT

An apparatus for inductive rotational-position sensing is disclosed. An apparatus may include an electrically conductive material defining a continuous path for electrical current to flow between a first and a second location. The continuous path may include a first path portion, defined as a generally clockwise path for the electrical current to flow around a geometric center of the continuous path, and a second path portion, defined as a generally counter-clockwise path for the electrical current to flow around the geometric center. The continuous path may also include a radial-direction-reversal region at which one of the first path portion or the second path portion changes from being defined as a generally outward path for the electrical current to flow away from the geometric center to being defined as a generally inward path for the electrical current to flow toward the geometric center. Related systems, devices, and methods are also disclosed.

22 Claims, 16 Drawing Sheets

(58) Field of Classification Search
CPC ........ G01V 3/104; G01V 3/105; G01V 3/107; G01V 3/108; G01V 3/28
See application file for complete search history.

(56) References Cited

U.S. PATENT DOCUMENTS

| | | | |
|---|---|---|---|
| 3,281,826 | A | 10/1966 | Moffitt |
| 4,737,698 | A | 4/1988 | McMullin et al. |
| 4,847,548 | A | 7/1989 | Lafler |
| 4,853,604 | A | 8/1989 | McMullin et al. |
| 5,061,896 | A | 10/1991 | Schmidt |
| 5,239,288 | A | 8/1993 | Tsals |
| 6,111,402 | A | 8/2000 | Fischer |
| 6,236,199 | B1 | 5/2001 | Irle et al. |
| 6,239,571 | B1 | 5/2001 | Shimahara |
| 6,255,810 | B1 | 7/2001 | Irle et al. |
| 6,304,014 | B1 | 10/2001 | England et al. |
| 6,304,076 | B1 | 10/2001 | Madni et al. |
| 6,384,598 | B1 | 5/2002 | Hobein et al. |
| 6,522,128 | B1 | 2/2003 | Ely et al. |
| 6,591,217 | B1 | 7/2003 | Baur et al. |
| 6,593,730 | B2 | 7/2003 | Zapf |
| 6,605,940 | B1 | 8/2003 | Tabrizi et al. |
| 7,276,897 | B2 | 10/2007 | Lee |
| 7,385,389 | B2 | 6/2008 | Tahara et al. |
| 7,719,264 | B2 | 5/2010 | Tiemann |
| 7,726,208 | B2 | 6/2010 | Hoeller et al. |
| 7,821,256 | B2 | 10/2010 | Lee |
| 7,906,960 | B2 | 3/2011 | Lee |
| 8,278,911 | B2 | 10/2012 | Tiemann et al. |
| 8,339,126 | B2 | 12/2012 | Izak et al. |
| 8,451,000 | B2 | 5/2013 | Tiemann |
| 8,482,894 | B2 | 7/2013 | Yra et al. |
| 8,508,242 | B2 | 8/2013 | Shao et al. |
| 8,618,791 | B2 | 12/2013 | Grinberg et al. |
| 8,947,077 | B2 | 2/2015 | Lee et al. |
| 8,988,066 | B2 | 3/2015 | Shao et al. |
| 9,234,771 | B2 | 1/2016 | Sasaki |
| 9,322,636 | B2 | 4/2016 | Fontanet |
| 9,528,858 | B2 | 12/2016 | Bertin |
| 9,677,913 | B2 | 6/2017 | Wang et al. |
| 9,929,651 | B2 | 3/2018 | Cannankurichi et al. |
| 10,415,952 | B2 | 9/2019 | Reddy et al. |
| 10,444,037 | B2 | 10/2019 | Bertin |
| 10,760,928 | B1 | 9/2020 | Shaga et al. |
| 10,761,549 | B2 | 9/2020 | Sasmal et al. |
| 10,837,847 | B2 | 11/2020 | Smith, Jr. |
| 10,884,037 | B2 | 1/2021 | Chellamuthu et al. |
| 10,921,155 | B2 | 2/2021 | Shaga et al. |
| 2001/0001430 | A1 | 5/2001 | Ely et al. |
| 2002/0000129 | A1 | 1/2002 | Madni et al. |
| 2002/0097042 | A1 | 7/2002 | Kawate et al. |
| 2003/0062889 | A1 | 4/2003 | Ely et al. |
| 2003/0206007 | A1 | 11/2003 | Gass et al. |
| 2004/0065533 | A1 | 4/2004 | Schwesig et al. |
| 2004/0080313 | A1 | 4/2004 | Brosh |
| 2004/0081313 | A1 | 4/2004 | McKnight et al. |
| 2006/0119351 | A1 | 6/2006 | James et al. |
| 2006/0125472 | A1 | 6/2006 | Howard et al. |
| 2007/0001666 | A1 | 1/2007 | Lee |
| 2008/0054887 | A1 | 3/2008 | Lee |
| 2008/0164869 | A1 | 7/2008 | Bach et al. |
| 2008/0174302 | A1 | 7/2008 | Lee et al. |
| 2008/0176530 | A1 | 7/2008 | Kuhn et al. |
| 2008/0238416 | A1 | 10/2008 | Shiraga et al. |
| 2010/0271012 | A1 | 10/2010 | Patterson et al. |
| 2011/0101968 | A1 | 5/2011 | Brands et al. |
| 2012/0175198 | A1 | 7/2012 | Thibault et al. |
| 2012/0242304 | A1 | 9/2012 | Yra et al. |
| 2012/0242352 | A1 | 9/2012 | Gong et al. |
| 2013/0021023 | A1 | 1/2013 | Niwa et al. |
| 2013/0257417 | A1 | 10/2013 | Ely |
| 2013/0289826 | A1 | 10/2013 | Yoshitake et al. |
| 2015/0323349 | A1 | 11/2015 | Has et al. |
| 2016/0214648 | A1 | 7/2016 | Schoepe et al. |
| 2017/0141685 | A1 | 5/2017 | Cannankurichi et al. |
| 2017/0158231 | A1 | 6/2017 | Farrelly |
| 2017/0166251 | A1 | 6/2017 | Shao et al. |
| 2018/0120083 | A1 | 5/2018 | Reddy et al. |
| 2018/0196453 | A1 | 7/2018 | Sasmal et al. |
| 2018/0224301 | A1* | 8/2018 | Herrmann .............. G01D 5/204 |
| 2018/0274591 | A1 | 9/2018 | Maniouloux et al. |
| 2018/0274948 | A1 | 9/2018 | Maniouloux et al. |
| 2019/0009903 | A1 | 1/2019 | Chan et al. |
| 2019/0017845 | A1 | 1/2019 | Utermoehlen et al. |
| 2019/0063956 | A1 | 2/2019 | Bertin |
| 2019/0186891 | A1 | 6/2019 | Utermoehlen et al. |
| 2019/0195963 | A1 | 6/2019 | Qama |
| 2019/0226828 | A1 | 7/2019 | Lugani et al. |
| 2019/0326501 | A1 | 10/2019 | Gilbert et al. |
| 2019/0331541 | A1 | 10/2019 | Janisch et al. |
| 2020/0088549 | A1 | 3/2020 | Shao |
| 2020/0200569 | A1 | 6/2020 | Utermoehlen et al. |
| 2020/0271480 | A1 | 8/2020 | Shaga et al. |
| 2021/0063206 | A1 | 3/2021 | Ausserlechner |
| 2021/0255657 | A1 | 8/2021 | Miller et al. |
| 2021/0372823 | A1 | 12/2021 | Witts et al. |
| 2022/0034684 | A1 | 2/2022 | Le Goff et al. |
| 2022/0155050 | A1* | 5/2022 | Gillet .................... G01B 7/003 |

FOREIGN PATENT DOCUMENTS

| | | |
|---|---|---|
| DE | 102015220615 A1 | 4/2017 |
| DE | 102019207070 A1 | 11/2020 |
| EP | 0467514 A2 | 1/1992 |
| EP | 0845659 A2 | 6/1998 |
| EP | 1914520 A2 | 4/2008 |
| EP | 2145158 A2 | 1/2010 |
| EP | 2044389 B1 | 4/2010 |
| EP | 3245485 A1 | 11/2017 |
| EP | 3865825 A1 | 8/2021 |
| FR | 2304900 A1 | 10/1976 |
| GB | 1502697 A | 3/1978 |
| GB | 2394293 A | 4/2004 |
| JP | 3839449 B2 | 11/2006 |
| JP | 2021-025851 A | 2/2021 |
| WO | 2008/125853 A1 | 10/2008 |
| WO | 2008/139216 A2 | 11/2008 |
| WO | 2016/079465 A1 | 5/2016 |
| WO | 2017/100515 A1 | 6/2017 |
| WO | 2018/108783 A2 | 6/2018 |
| WO | 2019/152092 A1 | 8/2019 |
| WO | 2021/239175 A1 | 12/2021 |

OTHER PUBLICATIONS

Microchip Technology Inc., "Robust, Low-Cost and Noise-Immune Motion-Sensing Inductive Sensors", Automotive brochure, DS00002864A, www.microchip.com/automotive (Dec. 2018) 2 pages.
Disclosure of U.S. Appl. No. 62/990,403.
U.S. Appl. No. 17/075,157.
Application of Indian Application Serial No. 202021054245 on file with the Indian Patent Office (not yet published).
"A Revolution in Sensing: World's First Inductance-to-Digital Converter", LDC1000 Inductive Sensing Brochure, Texas Instruments, 2013, pp. 1-6, Almaden Press, San Jose, CA.
"Inductive Sensor Coil Design Using LX3301A", AN-S1412 Application Note, Microsemi Corporate Headquarters, One Enterprise, Aliso Viejo, CA 92656 USA, Nov. 2017.
International Search Report from International Application No. PCT/US2021/070662, dated Jan. 3, 2022, 6 pages.
International Written Opinion from International Application No. PCT/US2021/070662, dated Jan. 3, 2022, 10 pages.
Song et al., "Simulations of Nonuniform Behaviors of Multiple No-Insulation (RE)Ba2Cu307-x HTS Pancake Coils During Charging and Discharging", IEEE Transactions on Applied Superconductivity, vol. 26, No. 4, (Jun. 2016) 5 pages.
English Translation of WO 2021239175 (Year: 2021).

* cited by examiner

SENSE COIL FOR INDUCTIVE ROTATIONAL-POSITION SENSING, AND RELATED DEVICES, SYSTEMS, AND METHODS

CROSS-REFERENCE TO RELATED APPLICATION

This application claims the benefit under 35 U.S.C. § 119(e) of U.S. Provisional Patent Application Ser. No. 63/200,751, filed Mar. 25, 2021, entitled "SENSE COIL FOR INDUCTIVE ROTATIONAL-POSITION SENSING, AND RELATED DEVICES, SYSTEMS, AND METHODS," the disclosure of which is hereby incorporated herein in its entirety by this reference.

FIELD

This description relates, generally, to rotational-position sensing. More specifically, some examples relate to a sense coil for inductive rotational-position sensing, without limitation. Additionally, devices, systems, and methods are disclosed.

BACKGROUND

If a coil of wire is placed in a changing magnetic field, a voltage will be induced at ends of coil of wire. In a predictably changing magnetic field, the induced voltage will be predictable (based on factors including the area of the coil affected by the magnetic field and the degree of change of the magnetic field). It is possible to disturb a predictably changing magnetic field and measure a resulting change in the voltage induced in the coil of wire. Further, it is possible to create a sensor that measures movement of a disturber of a predictably changing magnetic field based on a change in a voltage induced in a coil of wire.

BRIEF DESCRIPTION THE DRAWINGS

While this disclosure concludes with claims particularly pointing out and distinctly claiming specific examples, various features and advantages of examples within the scope of this disclosure may be more readily ascertained from the following description when read in conjunction with the accompanying drawings, in which:

Figure 2A:
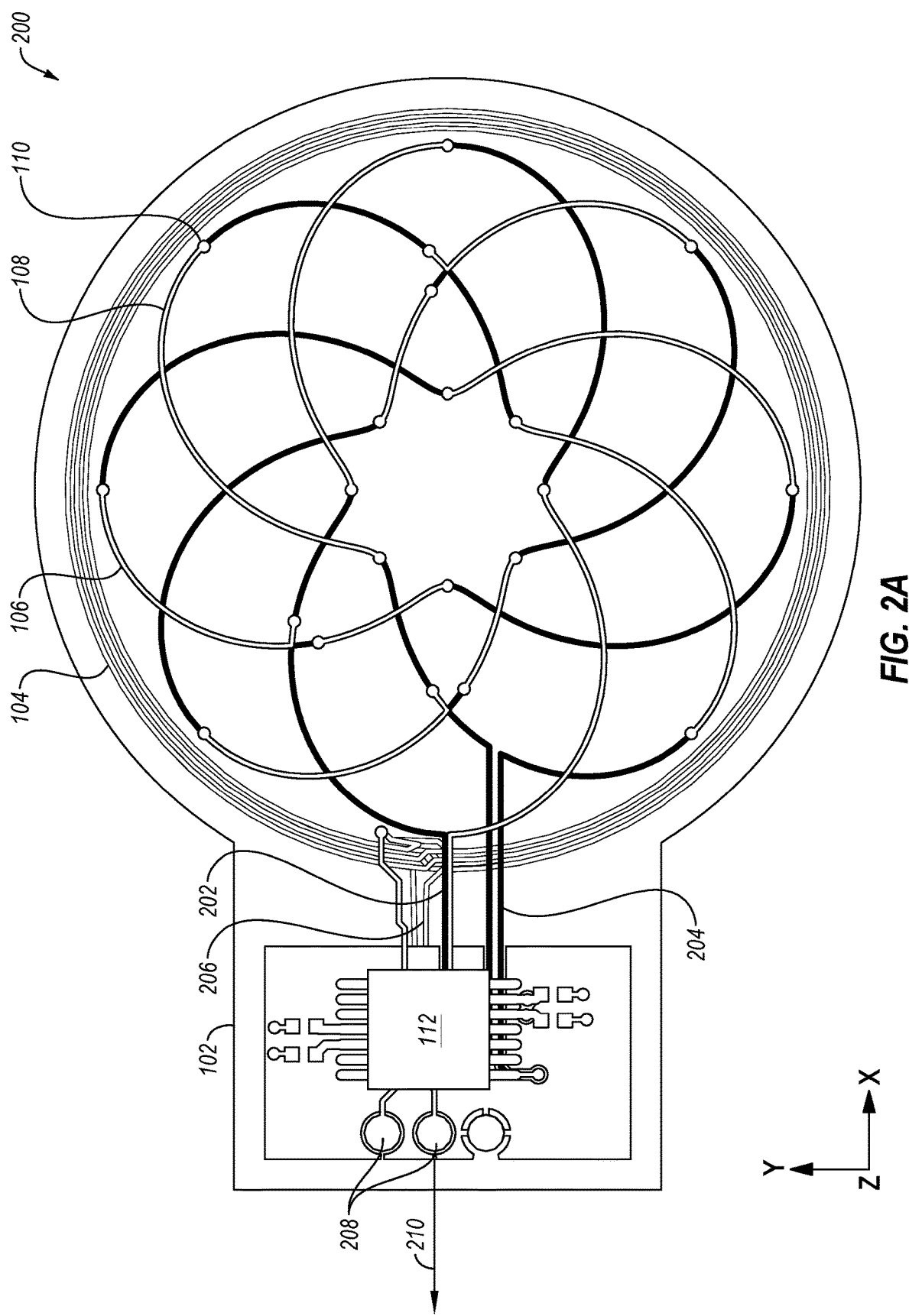
Figure 2B:
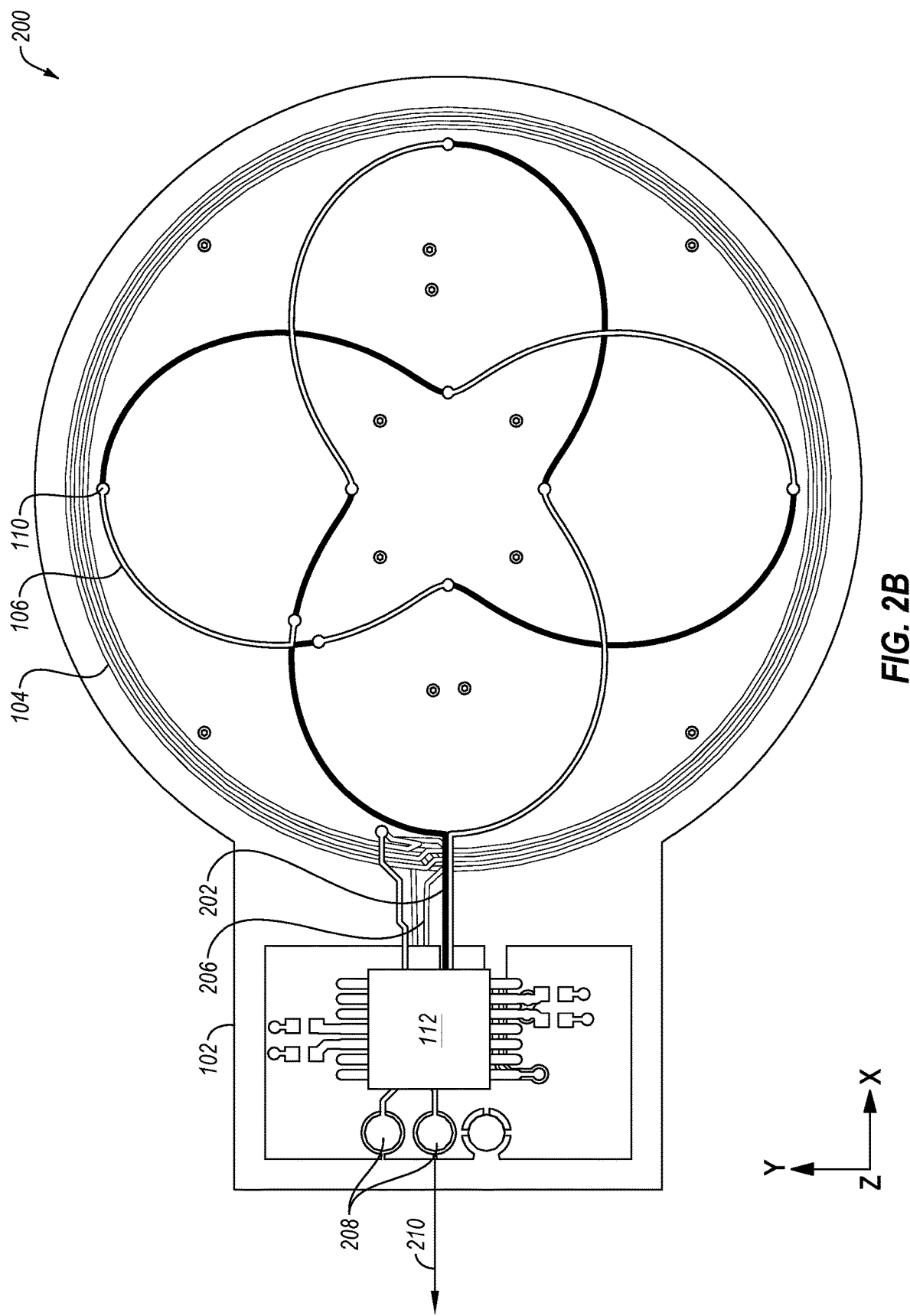
Figure 2C:
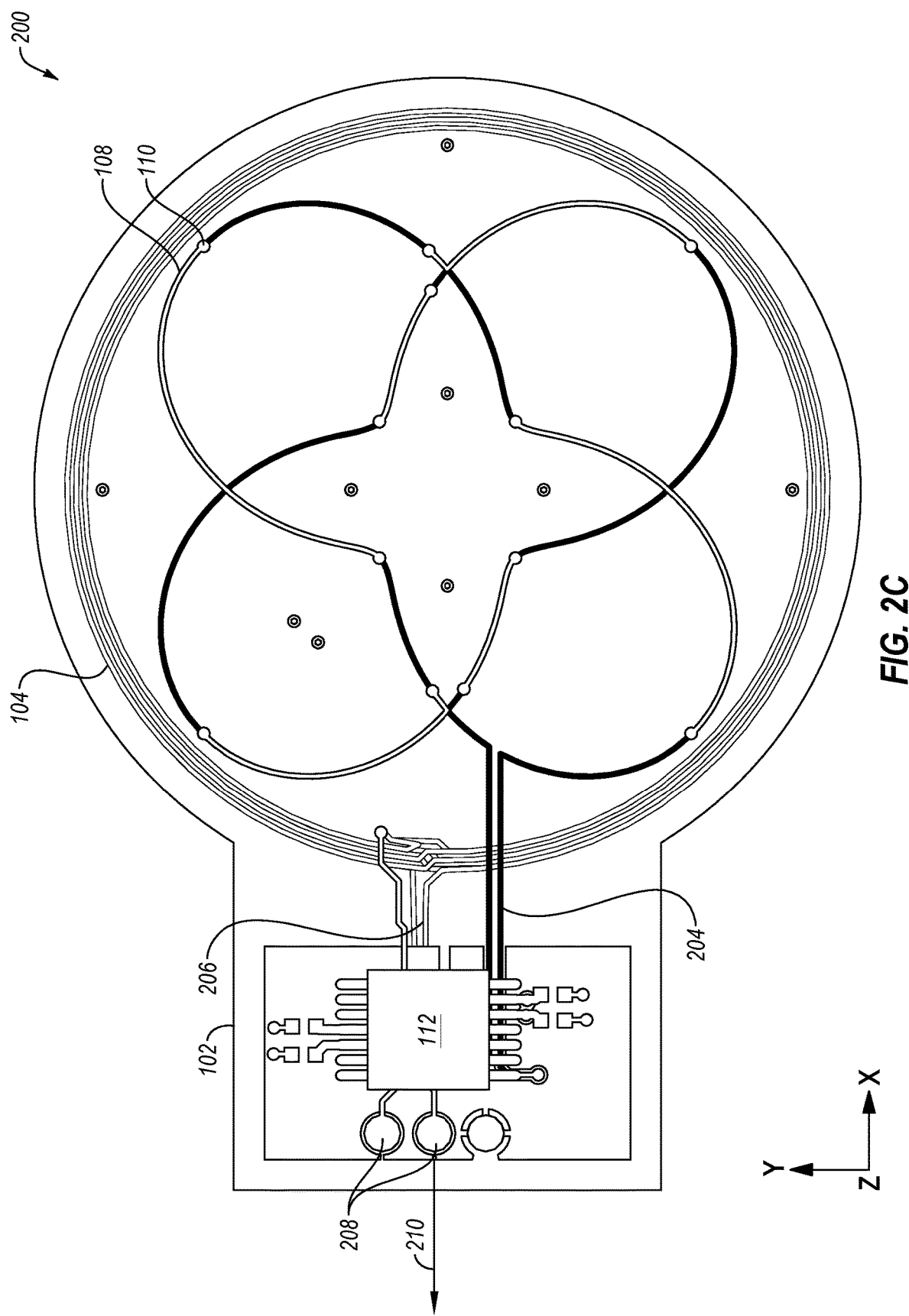

Each of FIG. 2A, FIG. 2B, and FIG. 2C is a diagram illustrating a top view of some elements of an example rotational-position sensor according to one or more examples.

Figure 3:
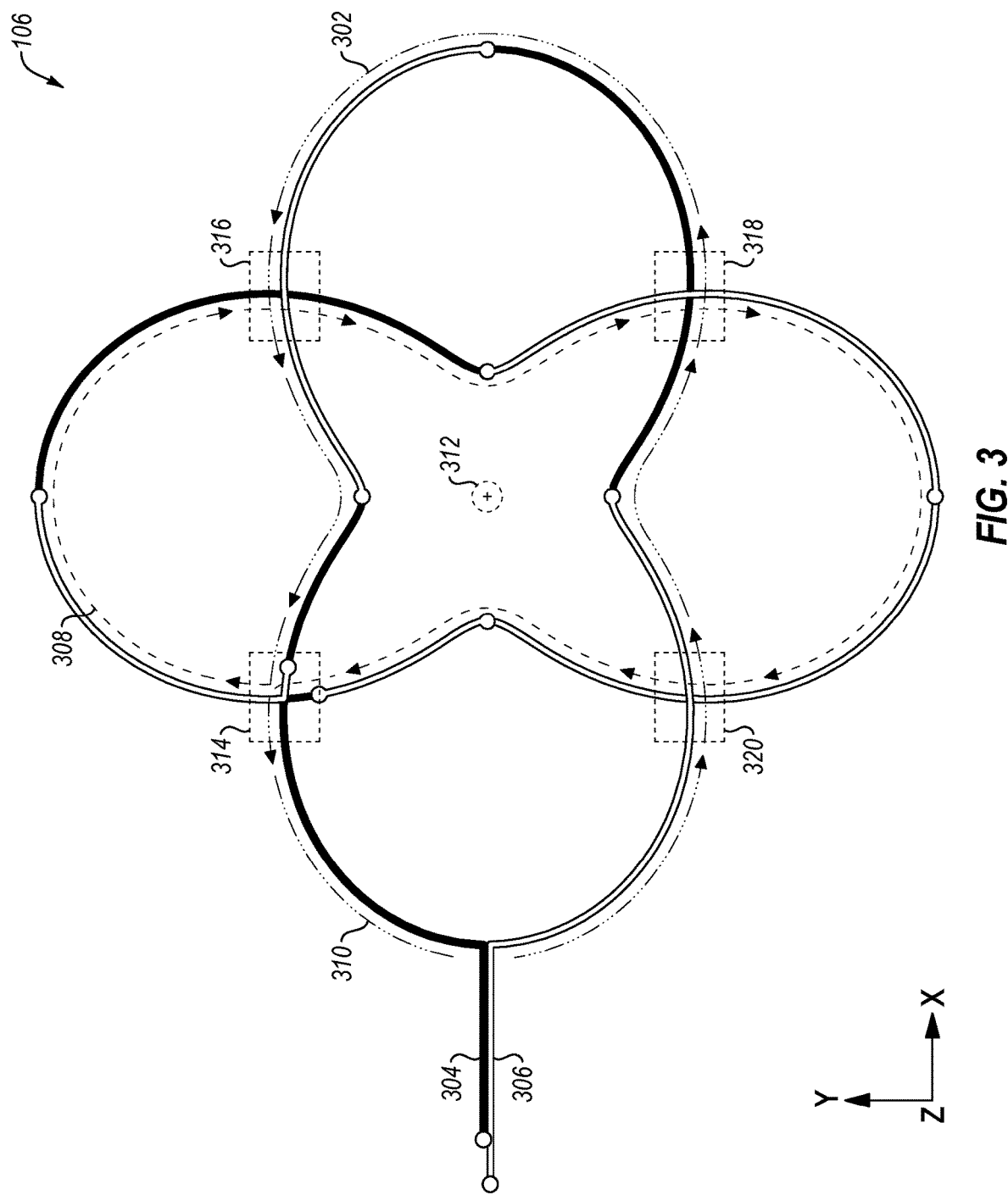

FIG. 3 is a diagram illustrating a top view of an example sense coil of a rotational-position sensor according to one or more examples.

Figure 4A:
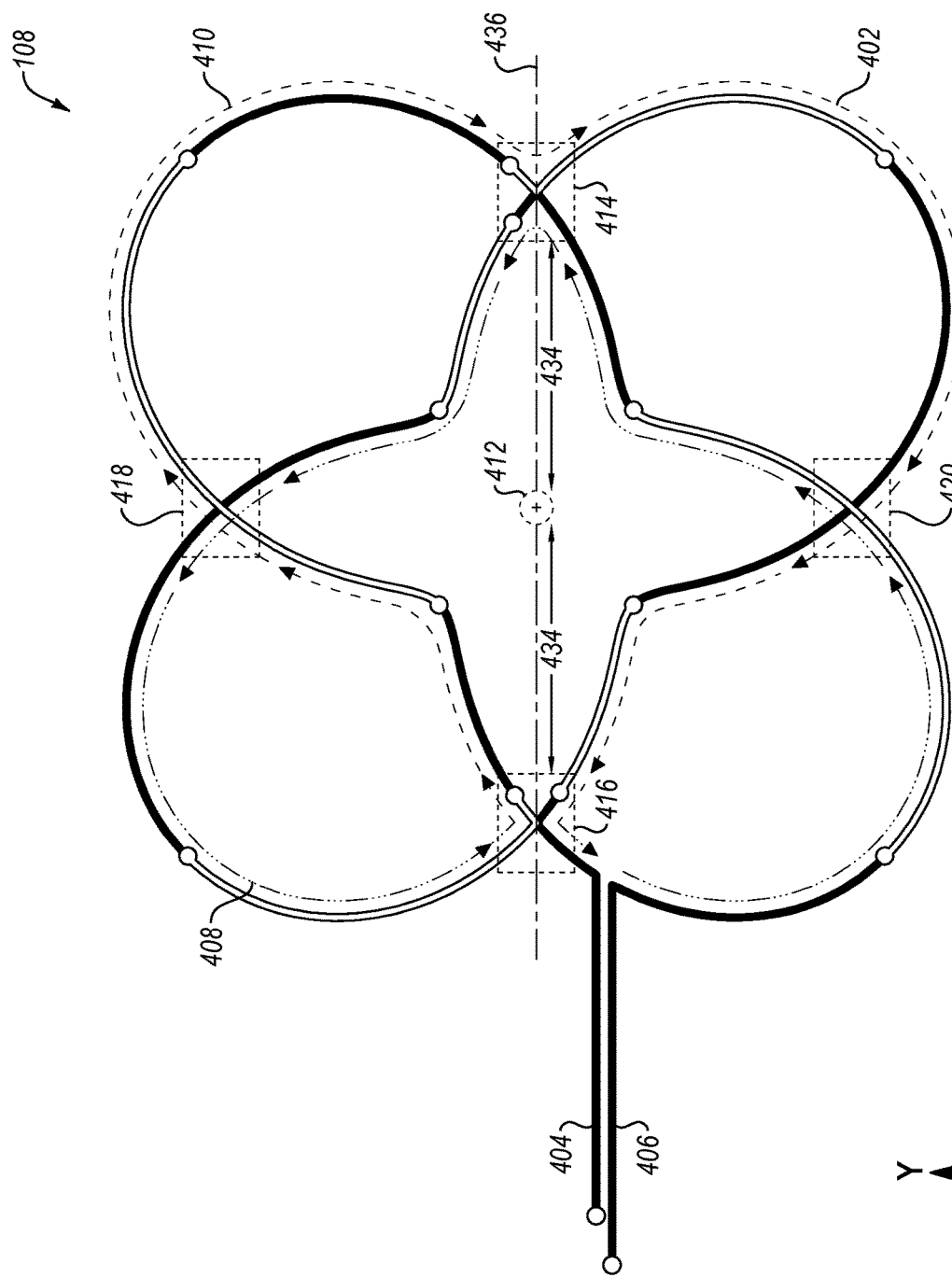

FIG. 4A is a diagram illustrating a top view of another example sense coil of a rotational-position sensor according to one or more examples.

Figures 4B, 4C:
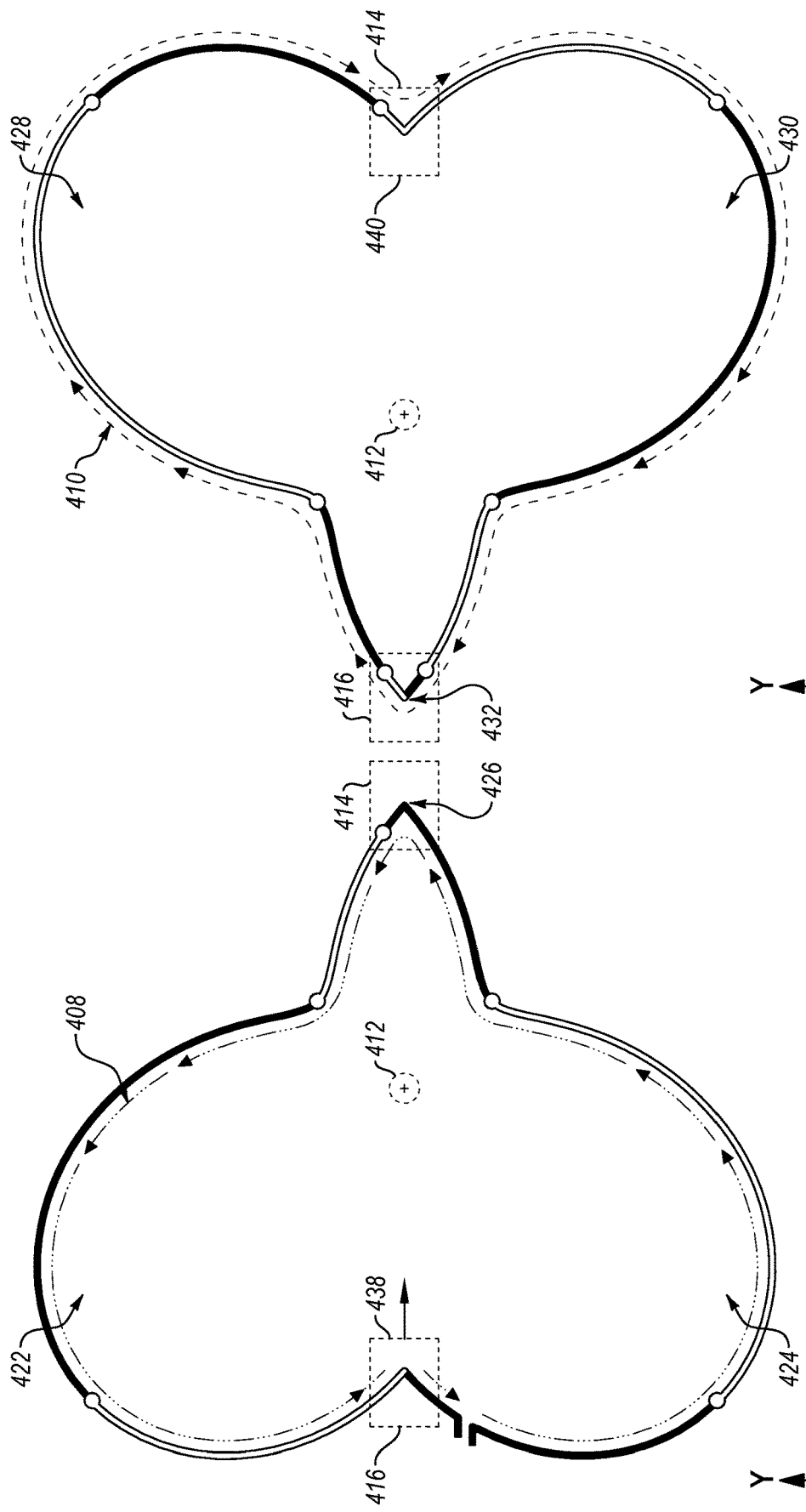

FIG. 4B is a diagram illustrating a top view of a first path portion of the example sense coil of FIG. 4A according to one or more examples.

FIG. 4C is a diagram illustrating a top view of a second path portion of the example sense coil of FIG. 4A according to one or more examples.

Figure 5:
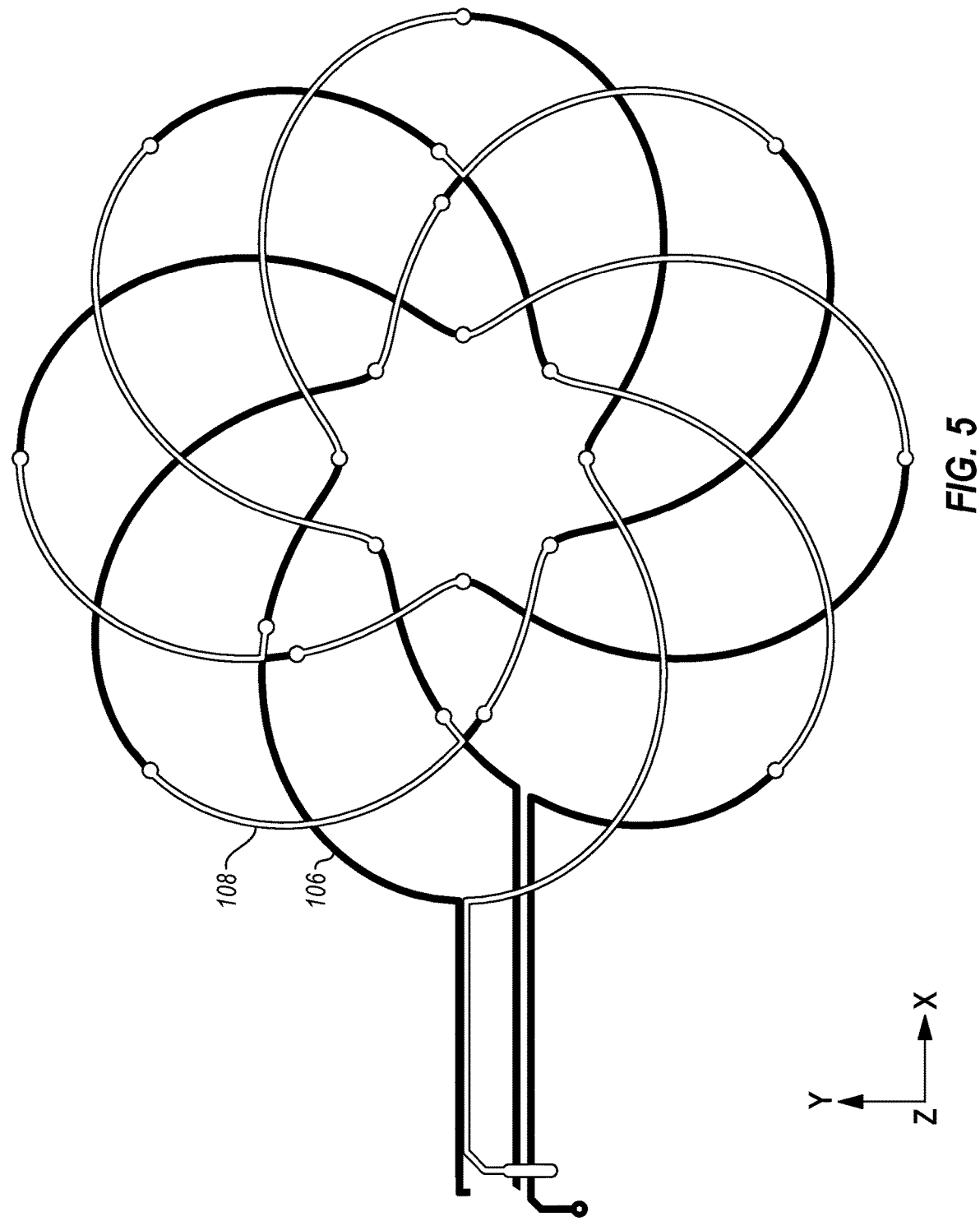

FIG. 5 is a diagram illustrating a top view of two example sense coils of a rotational-position sensor according to one or more examples.

Figure 6:
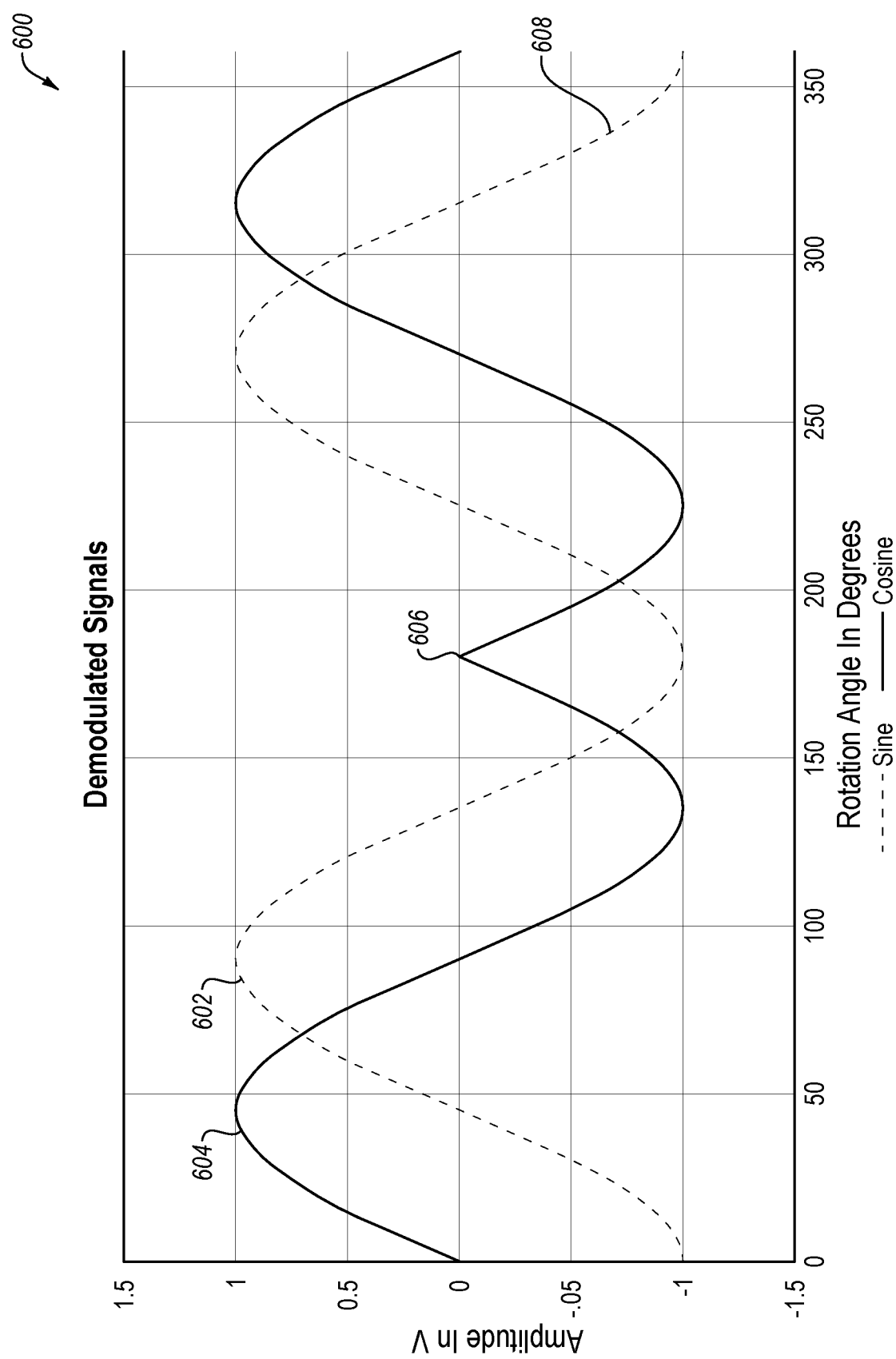

FIG. 6 is a graph illustrating example simulated demodulated signals according to one or more examples.

Figure 7:
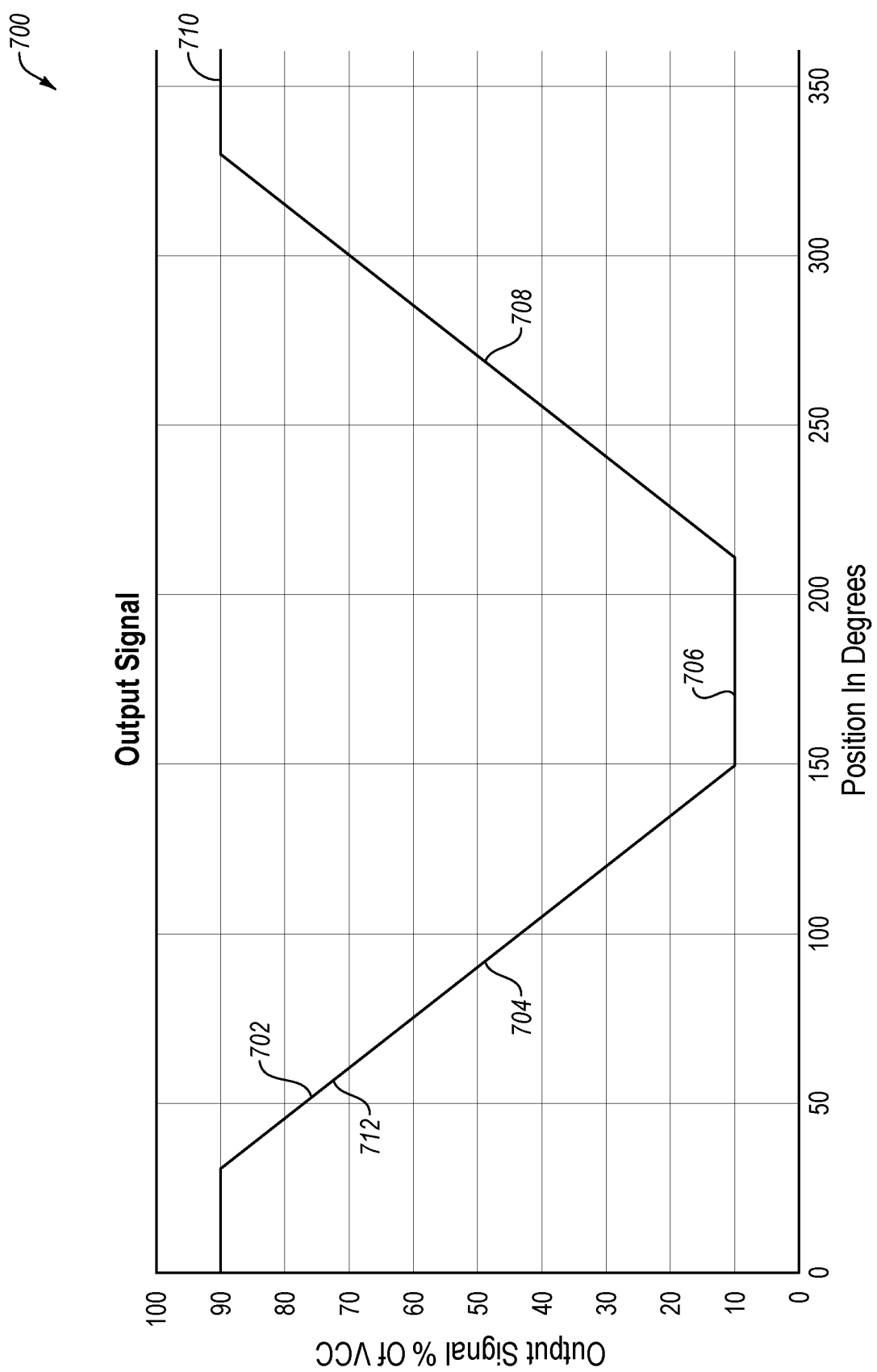

FIG. 7 is a graph illustrating an example simulated output signal according to one or more examples.

Figure 8:
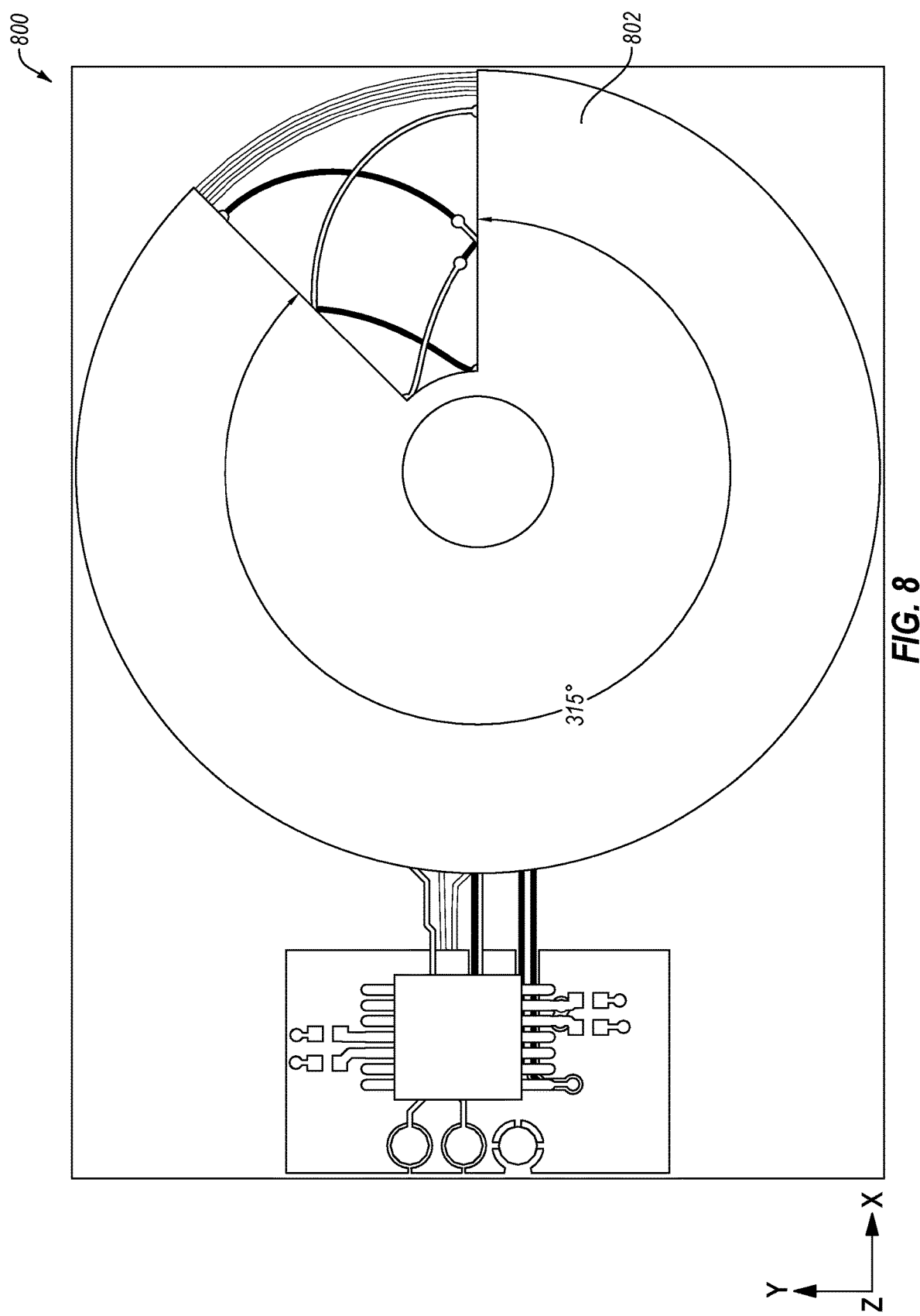

FIG. 8 is a diagram illustrating a top view of another example rotational-position sensor according to one or more examples.

Figure 9:
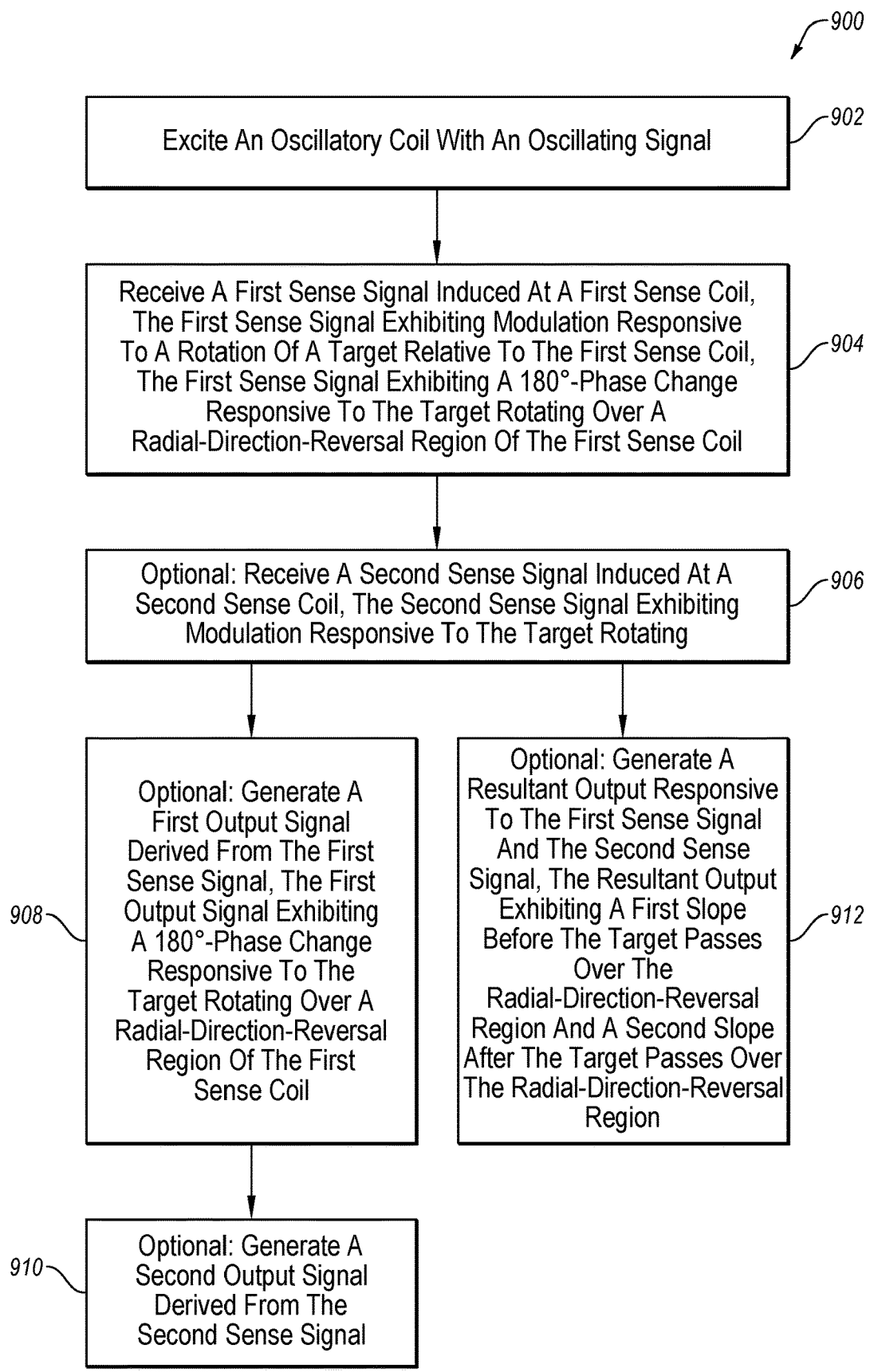

FIG. 9 illustrates a method for rotational-position sensing according to one or more examples.

Figure 10:
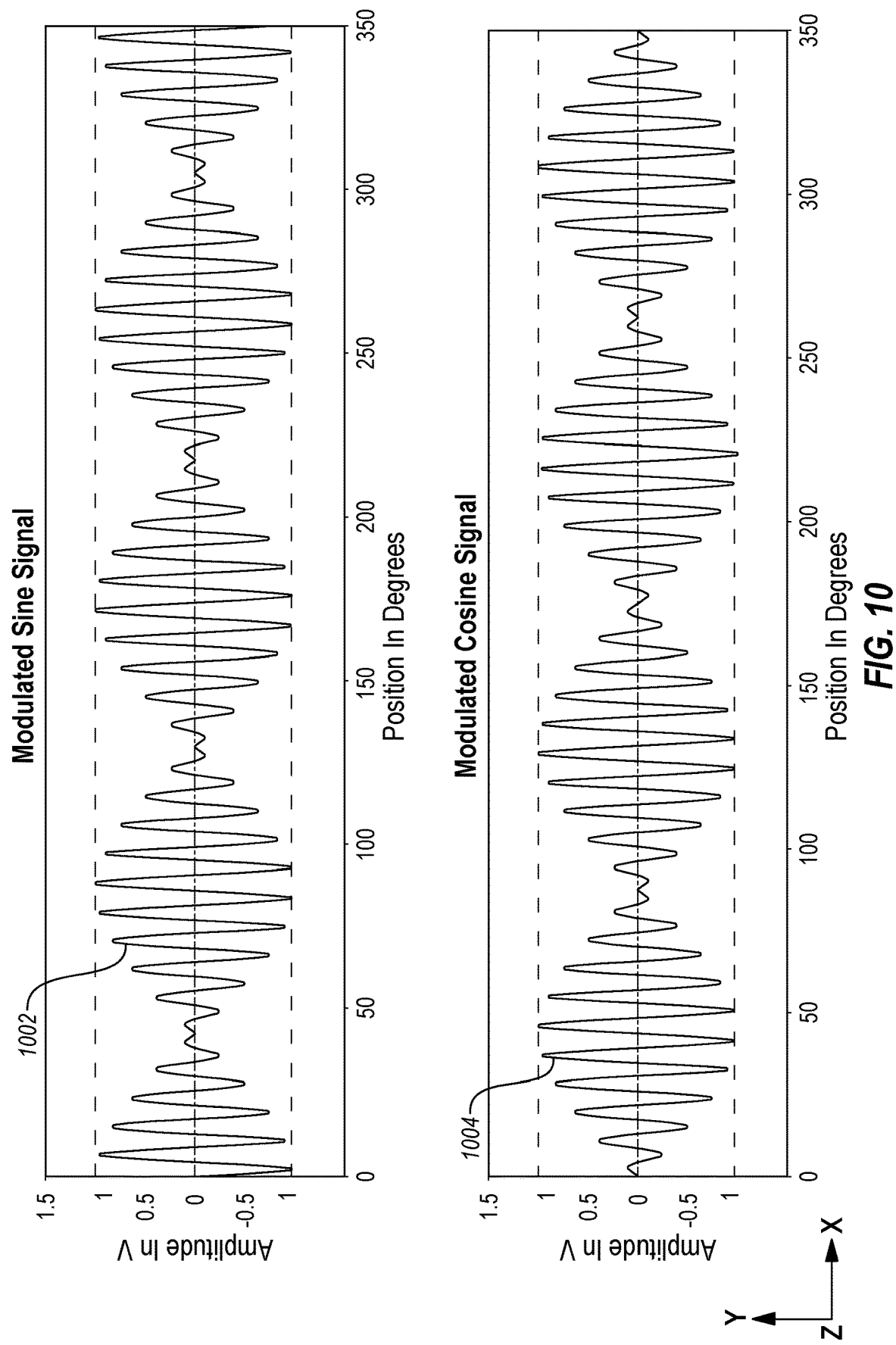

FIG. 10 includes two graphs illustrating simulated modulated signals according to one or more examples.

Figure 11:
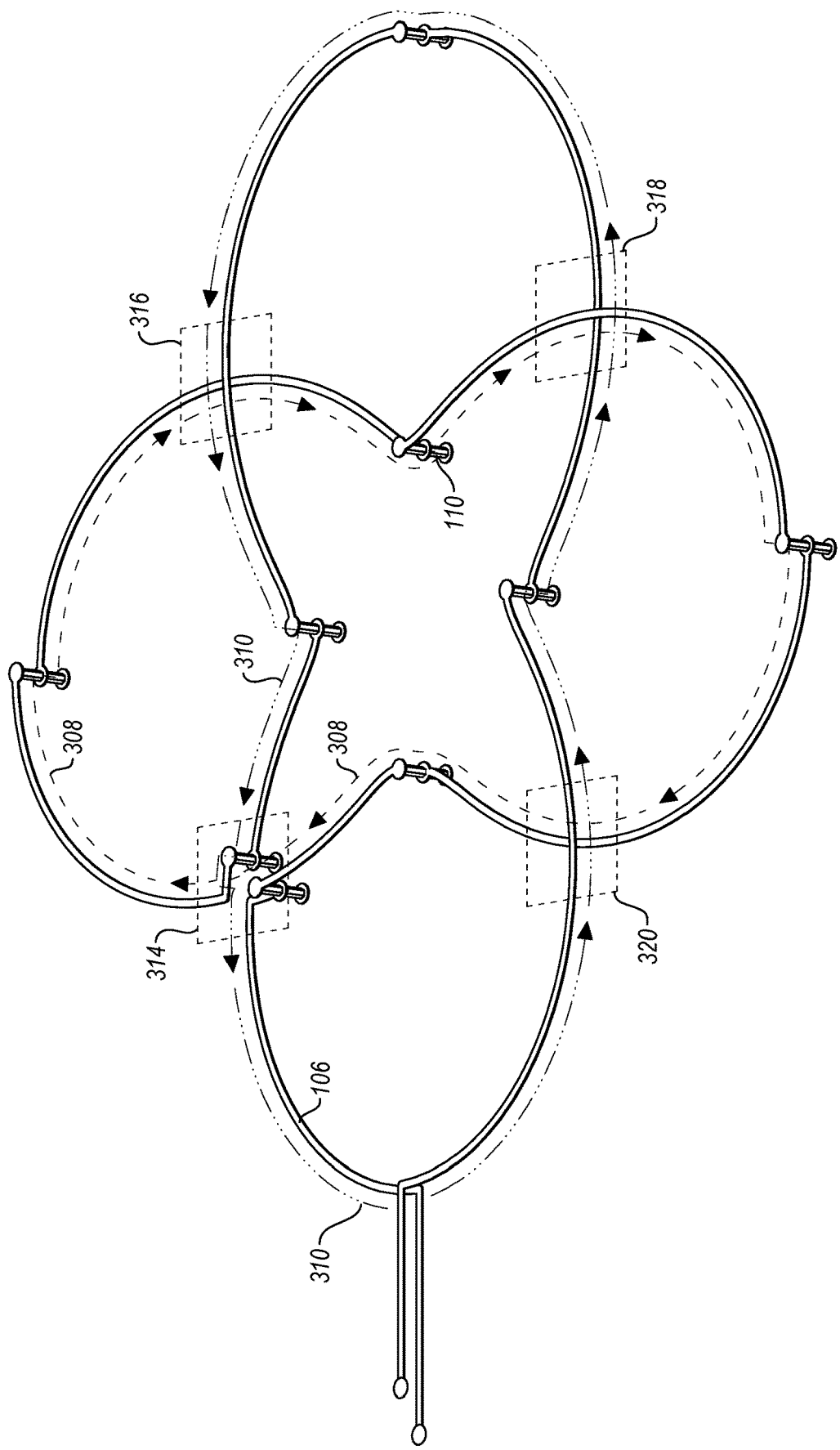

FIG. 11 is a perspective view of an example sense coil of a rotational-position sensor according to one or more examples.

Figure 12:
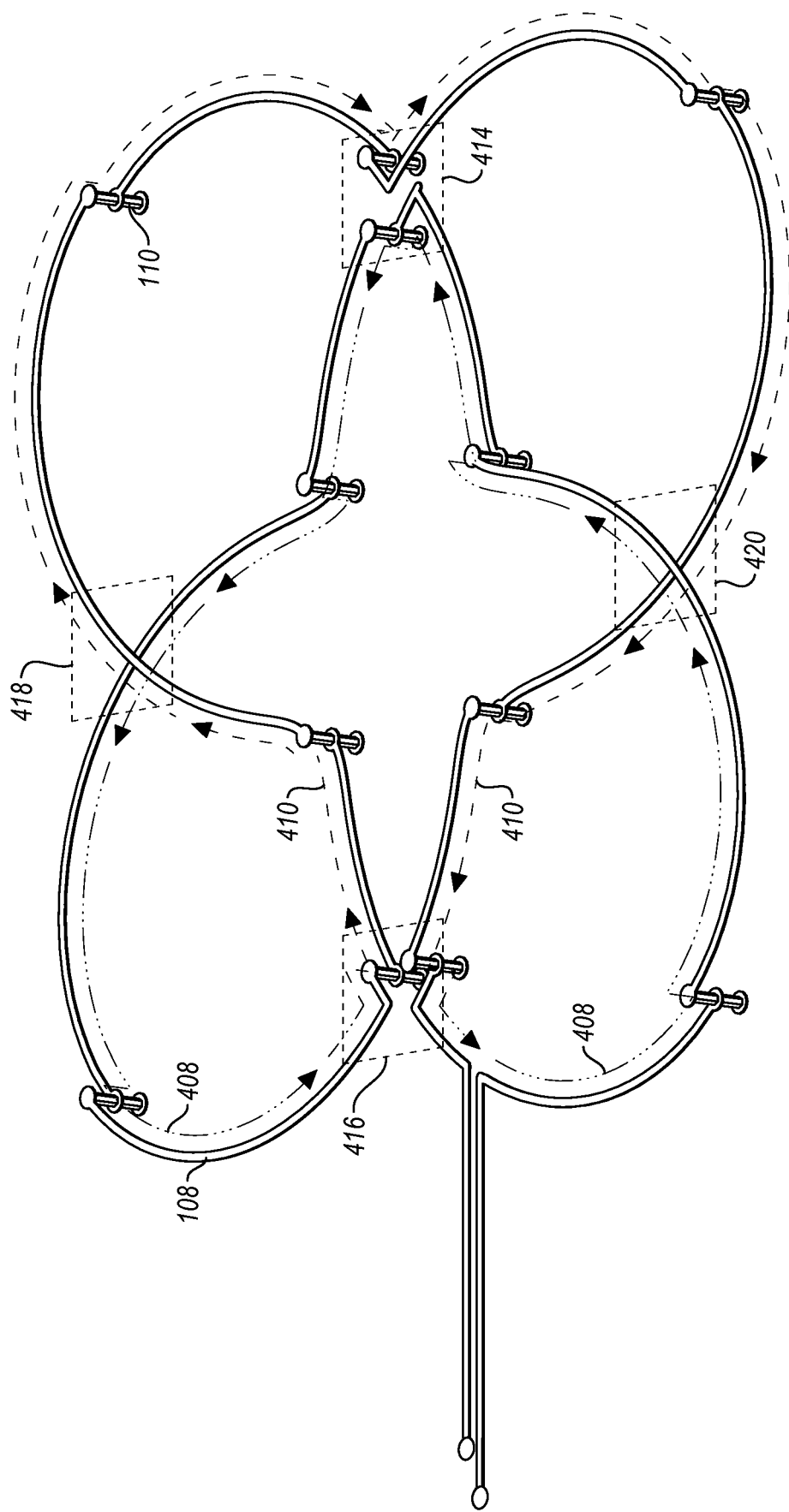

FIG. 12 is a perspective view of another example sense coil of a rotational-position sensor according to one or more examples.

Figure 13:
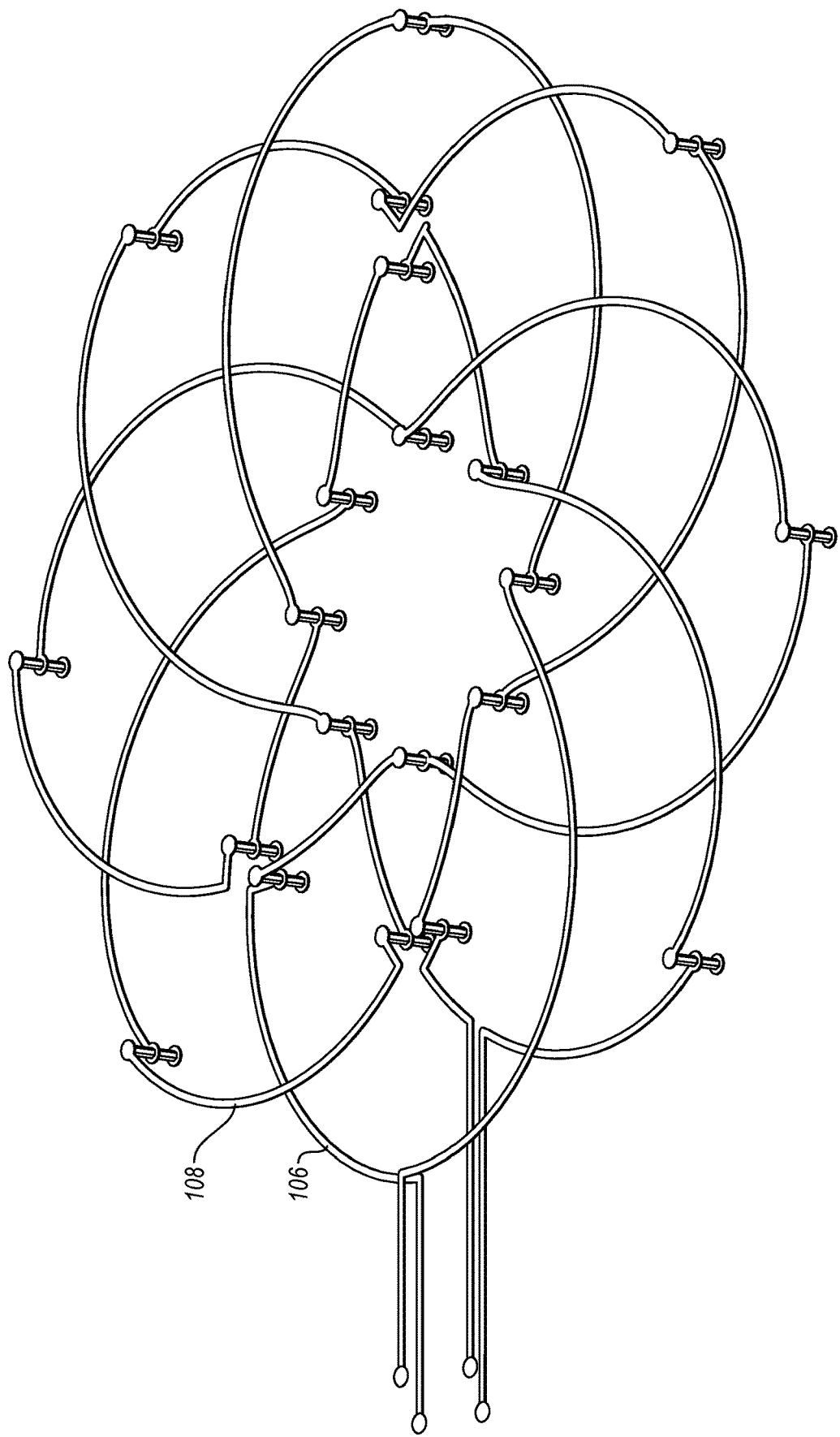

FIG. 13 is a perspective view of two example sense coils of a rotational-position sensor according to one or more examples.

DETAILED DESCRIPTION

In the following detailed description, reference is made to the accompanying drawings, which form a part hereof, and in which are shown, by way of illustration, specific examples of examples in which the present disclosure may be practiced. These examples are described in sufficient detail to enable a person of ordinary skill in the art to practice the present disclosure. However, other examples may be utilized, and structural, material, and process changes may be made without departing from the scope of the disclosure.

The illustrations presented herein are not meant to be actual views of any particular method, system, device, or structure, but are merely idealized representations that are employed to describe the examples of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

The following description may include examples to help enable one of ordinary skill in the art to practice the disclosed examples. The use of the terms "exemplary," "by example," and "for example," means that the related description is explanatory, and though the scope of the disclosure is intended to encompass the examples and legal equivalents, the use of such terms is not intended to limit the scope of an example of this disclosure to the specified components, steps, features, functions, or the like.

It will be readily understood that the components of the examples as generally described herein and illustrated in the drawing could be arranged and designed in a wide variety of different configurations. Thus, the following description of various examples is not intended to limit the scope of the present disclosure, but is merely representative of various examples. While the various aspects of the examples may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be depicted by block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, and symbols that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal. A person having ordinary skill in the art would appreciate that this disclosure encompasses communication of quantum information and qubits used to represent quantum information.

The various illustrative logical blocks, modules, and circuits described in connection with the examples disclosed herein may be implemented or performed with a general purpose processor, a special purpose processor, a Digital Signal Processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to examples of the present disclosure.

The examples may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, or a subprogram, without limitation. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

A rotational-position sensor may include an oscillator, an oscillator coil, a first sense coil, a second sense coil, a target, and an integrated circuit. The oscillator may be configured to generate an excitation signal. The oscillator coil may be excited by the excitation signal. The oscillating signal on the oscillating coil may generate a changing (oscillating) magnetic field within a space encircled by the oscillating coil.

The first sense coil and the second sense coil may be positioned within the space encircled by the oscillating coil. The changing magnetic field generated by the oscillating coil may induce a first voltage at ends of the first sense coil and a second voltage at ends of the second sense coil. The first voltage at the ends of the first sense coil may oscillate in response to the oscillation of the excitation signal and may be a first sense signal. The second voltage at the ends of the second sense signal may oscillate in response to the oscillation of the excitation signal and may be a second sense signal.

The target may be positioned relative to the oscillating coil, the first sense coil, and the second sense coil. For example, the target may be positioned above a portion the oscillating coil, the first sense coil, and the second sense coil, without limitation. The target may disturb some of the changing magnetic field that passes through one or more of the first sense coil and the second sense coil.

The first sense coil and the second sense coil may be configured such that the location of the target above one or more of the first sense coil and the second sense coil may affect the first sense signal and the second sense signal induced in the first sense coil and the second sense coil respectively. For example, in response to the target being over a loop in the first sense coil, the amplitude of the first sense signal may be less than the amplitude of the first sense signal when the target is not over the loop in the first sense coil.

Further, the target may be configured to rotate around an axis of rotation that is perpendicular to a plane of one or more of the oscillating coil, the first sense coil and the second sense coil (in other words, the target may rotate in a plane parallel to a plane of one or more of the first sense coil, the second sense coil and the oscillating coil). A geometric center of each of the first sense coil, the second sense coil and the oscillating coil may be at the axis of rotation.

As the target rotates around the axis of rotation, each of the first sense signal of the first sense coil and the second sense signal of the second sense coil may be amplitude modulated in response to the rotation of the target.

In various examples, the integrated circuit may be configured to generate an output signal responsive to the first sense signal and the second sense signal. The output signal may be a fraction of a rail voltage (VCC) based on the first sense signal and the second sense signal. The output signal may be related to a rotational position of the target and successive samples of the output signal may be related to a rotational direction of the target. Thus, the rotational-position sensor may be configured to generate an output signal indicative of one or more of a rotational-position of a target and a direction of rotation of the target.

In various examples, the integrated circuit may be configured to generate a first output signals based on the first sense signal and a second output based on the second sense signal. The first output signal may be the first sense signal demodulated; the second output signal may be the second sense signal demodulated. Together, the two output signals may be related to a rotational position of the target and subsequent samples of the first and second output signals may be related to a rotational direction of the target.

Some examples include sense coils that causes an integrated circuit to generate a dual-slope output signal in response to a full rotation of the target around the axis of rotation. The dual-slope output signal may be an output signal with a known correlation to the rotational-position of a target. Other methods known to the inventors of this disclosure for generating a dual-slope output signal include using at least two rotational-position sensors.

Some examples include a configuration of sense coils that provide for generation of a dual-slope output signal using only one rotational-position sensor. These examples represent an improvement over the other methods known to the inventors of this disclosure by generating the same dual-slope output signal as the other methods while using fewer (e.g., one) rotational-position sensors.

Some examples include a configuration of sense coils and a target configured to be over a majority of the sense coils. A large target that is over a large portion of a sense coil (e.g., a majority of the sense coil) may disturb more of the magnetic field between the oscillating coil and the sense coils than a small target that is over a small portion of the sense coil. Thus, a large target positioned farther from the sense coils may affect the currents induced at the sense coils as much as a small target positioned closer to the sense coils. Thus, a larger target may allow for a larger airgap between the target and the sense coils than a smaller target.

Figure 1A:
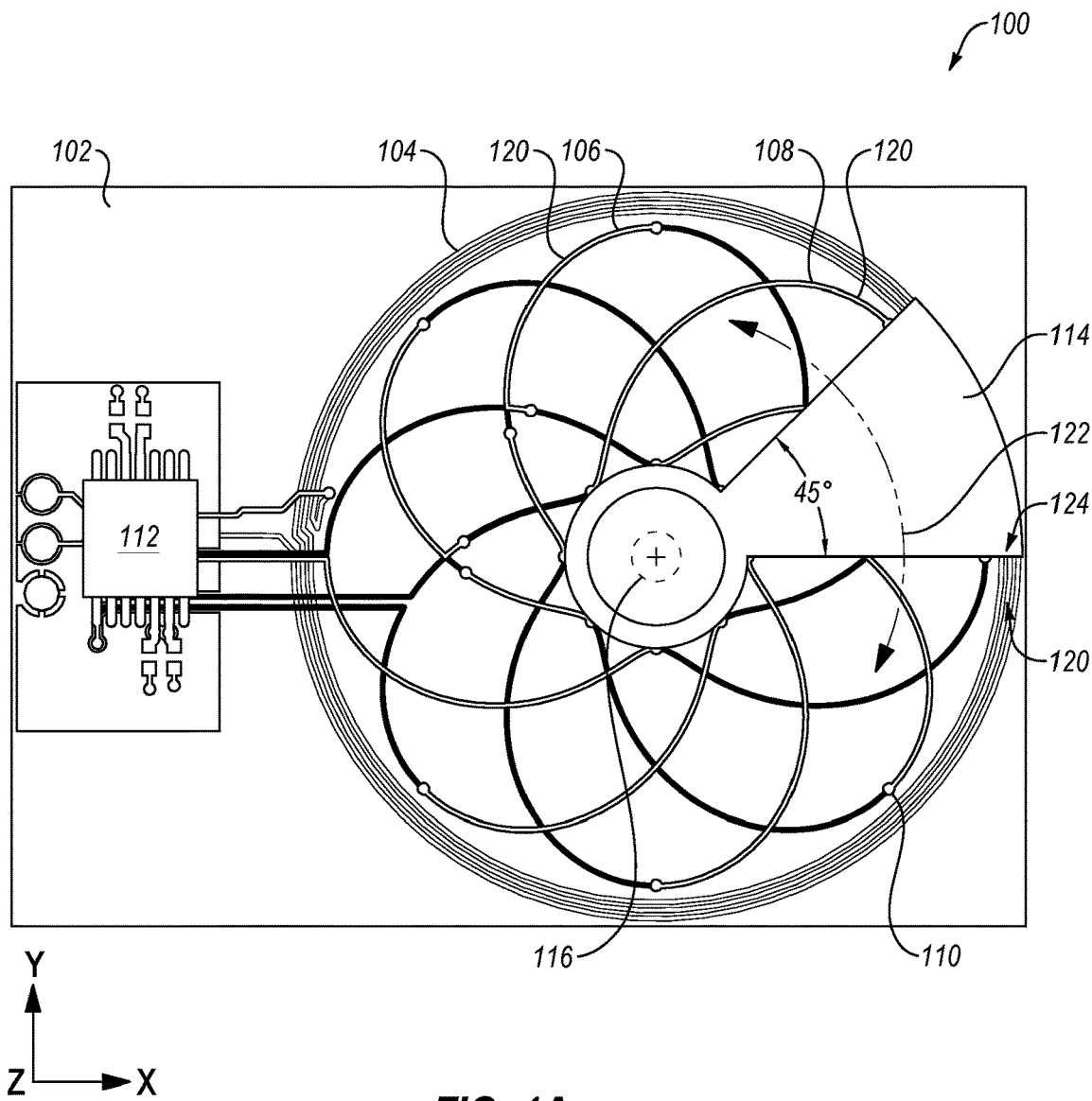
FIG. 1A is a diagram illustrating a top view of an example rotational-position sensor according to one or more examples.
Figure 1B:
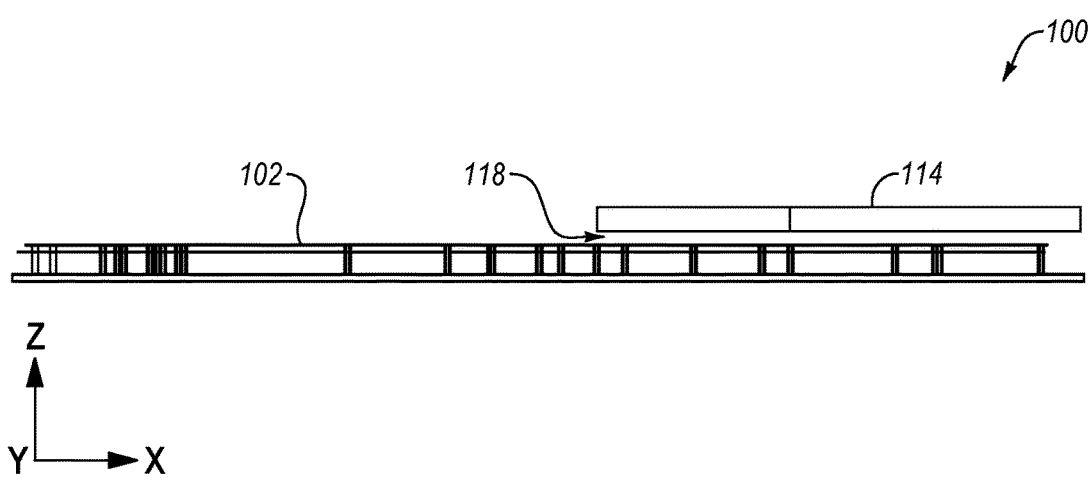
FIG. 1B is a diagram illustrating a side view of the example rotational-position sensor of FIG. 1A according to one or more examples.

FIG. 1A is a diagram illustrating a top view of a rotational-position sensor 100 according to one or more examples. FIG. 1B is a diagram illustrating a side view of the rotational-position sensor 100 of FIG. 1A according to one or more examples.

Rotational-position sensor 100 includes a support structure 102, an oscillator coil 104, a first sense coil (cosine coil 108), a second sense coil (sine coil 106), an integrated circuit (IC 112), and a target 114. For simplicity, the term "sense coil," when used alone, refers to the first sense coil.

Support structure 102 may be configured to support electrically conductive material 120 on, or in, two or more planes parallel to the depicted x-y plane that may, but are not required to, correspond to layers of support structure 102. Electrically conductive material 120 supported by support structure 102 may be arranged at support structure 102 to form oscillator coil 104, sine coil 106, and cosine coil 108. Support structure 102, including oscillator coil 104, sine coil 106, cosine coil 108, and various connecting lines may be, as a non-limiting example, a printed circuit board or other semiconductor substrate.

Oscillator coil 104 may be configured to carry an excitation signal around sine coil 106 and cosine coil 108 (i.e., oscillator coil 104 may be arranged to define a path that encircles sine coil 106 and cosine coil 108). Such an excitation signal may be an oscillating signal with a frequency of between 1 megahertz (MHz) and 6 MHz, without limitation.

Each of sine coil 106 and cosine coil 108 may be configured to be inductively coupled to oscillator coil 104. In particular, the excitation signal carried by oscillator coil 104 may induce a voltage signal (a "sense signal") at sine coil 106 and cosine coil 108 respectively (e.g., at the ends of sine coil 106 and cosine coil 108 as illustrated on the left of FIG. 1A proximate to IC 112). Thus, the excitation signal carried by oscillator coil 104 around sine coil 106 may induce a "sine sense signal" at sine coil 106 and the excitation signal carried by oscillator coil 104 around cosine coil 108 may induce a "cosine sense signal" at cosine coil 108.

Each of sine coil 106 and cosine coil 108 may be arranged in two or more planes of support structure 102 such that portions of sine coil 106 may be above portions of cosine coil 108 and portions of cosine coil 108 may be above portions of sine coil 106 without electrical coupling between sine coil 106 and cosine coil 108. Thus, a voltage of sine coil 106 may be independent of a voltage of cosine coil 108. Portions of coils in two or more planes may be electrically coupled by vias 110. In FIG. 1A, portions of sine coil 106 and cosine coil 108 in a first plane are illustrated using a pair of lines surrounding white space and portions of sine coil 106 and cosine coil 108 in a second plane (e.g., lower than the first plane) are illustrated using thick solid lines.

Target 114 may be arranged relative to oscillator coil 104, sine coil 106, and cosine coil 108 to disturb the magnetic field generated at oscillator coil 104 that magnetically couples oscillator coil 104 to sine coil 106 and oscillator coil 104 to cosine coil 108. Target 114 may affect a degree of magnetic coupling between oscillator coil 104 and sine coil 106 and between oscillator coil 104 and cosine coil 108. As a non-limiting example target 114 may be formed of a non-ferromagnetic material 124. Target 114 may be arranged to cover between 0° and 90° of a circle centered at axis 116. As a specific, non-limiting example, target 114 may be arranged to cover 45° of a circle centered at axis 116.

As illustrated in FIG. 1B, target 114 may be positioned above support structure 102. In particular, there may be an airgap 118 between target 114 and support structure 102. In some instances, a larger airgap may be desirable to provide, for example, greater manufacturing tolerances, without limitation. An example described with relation to FIG. 8 may provide for a larger airgap than is provided by other rotational-position sensors.

The degree to which target 114 disturbs the magnetic field between oscillator coil 104 and sine coil 106 may affect the sine sense signal at sine coil 106. Likewise, the degree to which target 114 disturbs the magnetic field between oscillator coil 104 and cosine coil 108 may affect the cosine sense signal at cosine coil 108. In particular, target 114 above a portion of sine coil 106 may decrease the amplitude of the sine sense signal and target 114 above a portion of cosine coil 108 may decrease the amplitude of the cosine sense signal.

A respective portion of sine coil 106 and cosine coil 108 under target 114 may determine a degree to which target 114 disturbs the magnetic coupling between oscillator coil 104 and sine coil 106 and between oscillator coil 104 and cosine coil 108, respectively. Thus, a respective portion of sine coil 106 and cosine coil 108 under target 114 may determine an amplitude of each of the sine sense signal and the amplitude of the cosine sense signal. For example, if a first lobe of sine coil 106 is entirely under target 114, the sine sense signal may be less than the cosine sense signal, which does not have a lobe entirely under target 114.

Target 114 may be configured to rotate around an axis of rotation (axis 116) e.g., in one of two rotation directions 122 (e.g., clockwise or counter-clockwise). The target 114 may rotate in an x-y plane (according to the reference coordinate plane depicted by FIG. 1) around the axis 116, which may extend in the z-dimension (perpendicular to the x-y coordinate plane depicted by FIG. 1). In various examples, axis 116 may be at the geometric center of one or more of oscillator coil 104, sine coil 106, and cosine coil 108. As target 114 rotates around axis 116, it may be over different portions of sine coil 106 and cosine coil 108. Thus, as target 114 rotates around axis 116 it may modulate the amplitude of each of the sine sense signal and cosine sense signal.

IC 112 may be configured to receive the sine sense signal and the cosine sense signal and generate one or more output signals based on the first sense signal and the second sense signal. Examples of output signals that may be generated by IC 112 are given in FIG. 6 and FIG. 7.

Each of FIG. 2A, FIG. 2B, and FIG. 2C is a diagram illustrating a top view of some elements of an example rotational-position sensor 200 according to one or more examples. FIG. 2A illustrates the shape and relative position of sine coil 106 and cosine coil 108, FIG. 2B illustrates the shape and relative position of sine coil 106 and FIG. 2C illustrates the shape and relative position of cosine coil 108.

Rotational-position sensor 200 is an example of rotational-position sensor 100 of FIG. 1A and FIG. 1B. However, in FIG. 2A, FIG. 2B, and FIG. 2C, to provide a clearer view of the respective geometries of sine coil 106 and cosine coil 108, a target is not depicted. In FIG. 2B, to provide a clearer view of the geometry of sine coil 106, cosine coil 108 is not depicted. And, in FIG. 2C, to provide a clearer view of the geometry of cosine coil 108, sine coil 106 is not depicted.

FIG. 2A and FIG. 2B illustrate sine signal lines 202 which may be configured to electrically couple sine coil 106 to IC 112. IC 112 may be configured to observe a voltage at sine signal lines 202. The voltage at sine signal lines 202 may be the sine sense signal. FIG. 2A and FIG. 2C illustrate cosine signal lines 204 which may be configured to electrically couple cosine coil 108 to IC 112. IC 112 may be configured to observe a voltage at cosine signal lines 204. The voltage at cosine signal lines 204 may be the cosine sense signal. FIG. 2A, FIG. 2B, and FIG. 2C illustrate oscillation signal lines 206 which may be configured to electrically couple IC 112 to oscillator coil 104. In various examples, IC 112 may be configured to provide an excitation signal at oscillation signal lines 206. FIG. 2A, FIG. 2B, and FIG. 2C illustrate signal interface 208 which may be configured to allow IC 112 to provide an output signal 210 to another device.

As can be seen from FIG. 2A, FIG. 2B, and FIG. 2C, sine coil 106 and cosine coil 108 each have a radially symmetric shape (e.g., including four lobes, without limitation). Because of the radial symmetry of sine coil 106 and cosine coil 108, as a target completes a full rotation around its axis of rotation, the modulation of sine sense signal and the modulation of cosine sense signal will repeat.

As can be seen from FIG. 2A, FIG. 2B, and FIG. 2C, each of sine coil 106 and cosine coil 108 have a similar shape. Because of the similar shape of sine coil 106 and cosine coil 108, as a target rotates above sine coil 106 and cosine coil 108, the sine sense signal and the cosine sense signal will be similarly modulated.

However, as can be seen from FIG. 2A, FIG. 2B, and FIG. 2C, the shape of cosine coil 108 is rotated relative to sine coil 106. Because of the relative rotation of cosine coil 108 relative to sine coil 106, as a target rotates above sine coil 106 and cosine coil 108, the sine sense signal will be modulated at a different time than the cosine sense signal. In the non-limiting example illustrated in FIGS. 1A, 2A, and 5, the rotation is 45°.

Owing to the repeating nature of the modulation of sine sense signal and the repeating, but out of phase, nature of the modulation of cosine sense signal, sine coil 106 is referred to using the term "sine" and cosine coil 108 is referred to using the term "cosine." Likewise, a sense signal of the sine coil 106 is referred to using the term "sine" and a sense signal of the cosine coil 108 is referred to using the term "cosine." The terms "sine" and "cosine" are used for descriptive purposes only and are not intended to limit the scope of this disclosure in any other way.

The out-of-phase relationship between the shapes of sine coil 106 and cosine coil 108 allows IC 112 to determine one or more of a position and rotational direction of target 114 relative to sine coil 106 and cosine coil 108. For example, if the demodulated sine sense signal has a greater amplitude than the demodulated cosine sense signal, IC 112 may be able to determine that the target is closer to one of 0°, 90°, 180°, or 270° than to one of 45°, 135°, 225°, or 315°, where the degrees are determined based on a pre-determined reference position. And, if in successive samples of the demodulated sine sense signal and the demodulated cosine sense signal, the amplitude of the demodulated sine sense signal is increasing and the amplitude of the demodulated cosine sense signal is decreasing, IC 112 may be able to determine that the target is approaching one of 0°, 90°, 180°, or 270°, rather than moving away therefrom.

FIG. 3 is a diagram illustrating a top view of an example sine coil 106 of a rotational-position sensor according to one or more examples. FIG. 3 illustrates a continuous path 302 that an electrical current may take through sine coil 106. The implications of the continuous path 302 are additionally described with regard to FIG. 6 and FIG. 7.

Sine coil 106 may be part of a rotational-position sensor (e.g., rotational-position sensor 100 of FIG. 1A and FIG. 1B or rotational-position sensor 200 of FIG. 2A and FIG. 2B, without limitation).

Sine coil 106 defines a continuous path 302 between a first location 304 (e.g., at a first sine signal line, without limitation) and a second location 306, (e.g., at a second sine signal line, without limitation). The arrows illustrated by FIG. 3 are to illustrate continuous path 302 and a direction of continuous path 302. Sine coil 106 may be configured such that an electrical current may traverse the continuous path 302. For example, an excitation signal at an oscillating coil (e.g., oscillator coil 104 of FIG. 1A, FIG. 1B, FIG. 2A, FIG. 2B, and FIG. 2C) may cause an oscillating sine sense signal in sine coil 106. Between one time and a next time, i.e., during a first half of a cycle, the oscillating current may flow on the continuous path 302 of sine coil 106 in the direction illustrated by the arrows of FIG. 3. According to the oscillation of the excitation signal, and the oscillation of the sine sense signal, current may also traverse the continuous path 302 in a reverse direction, i.e., during a second half of the cycle. However, for descriptive purposes, in the present disclosure, the path will be described as having a direction, i.e., between first location 304 and second location 306.

The continuous path 302 includes a first path portion 308, illustrated using dashed-line arrows, and a second path portion 310, illustrated using dash-dotted-line arrows. First path portion 308 may be defined by the direction of first path portion 308 being generally clockwise around a geometric center 312 of the continuous path 302, and second path portion 310 may be defined by the direction of second path portion 310 being generally counter-clockwise around a geometric center 312 of the continuous path 302.

The continuous path 302 includes coupling region 314 at which first path portion 308 may be configured to redirect flow of electrical current onto second path portion 310 and second path portion 310 may be configured to redirect flow of electrical current onto first path portion 308.

The continuous path 302 also includes a first crossover region 316, a second crossover region 318, and a third crossover region 320, at which one of first path portion 308 or second path portion 310 may be over the other of first path portion 308 and second path portion 310.

FIG. 11 is a perspective view of an example sense coil of a rotational-position sensor according to one or more examples. In particular, FIG. 11 illustrates sine coil 106. The perspective view of FIG. 11 was selected to illustrate that at coupling region 314, first path portion 308, at a lower x-y plane, redirects current onto second path portion 310 at the lower x-y plane and at coupling region 314, second path portion 310, at a higher x-y plane, redirects current onto first path portion 308 at the higher x-y plane. Also illustrated in FIG. 11 are first crossover region 316, second crossover region 318, and third crossover region 320, at which, in contrast to coupling region 314, the direction of a flow of current remains generally the same, e.g., as a portion of the first path portion 308 passes over the second path portion 310 or vice versa.

FIG. 4A is a diagram illustrating a top view of an example cosine coil 108 of a rotational-position sensor according to one or more examples. FIG. 4B is a diagram illustrating a top view of a first path portion 408 of the example cosine coil 108 of FIG. 4A according to one or more examples. FIG. 4C is a diagram illustrating a top view of a second path portion 410 of the example cosine coil 108 of FIG. 4A according to one or more examples. FIG. 4A, FIG. 4B, and FIG. 4C collectively illustrate a continuous path 402 that an electrical current may take through cosine coil 108. The implications of the continuous path 402 are additionally described with regard to FIG. 6 and FIG. 7.

Cosine coil 108 may be part of a rotational-position sensor (e.g., rotational-position sensor 100 of FIG. 1A and FIG. 1B or rotational-position sensor 200 of FIG. 2A FIG. 2C, without limitation).

Similar to what was described with regard to sine coil 106 of FIG. 3, cosine coil 108 defines a continuous path 402 between a first location 404 (e.g., at a first cosine signal line, without limitation) and a second location 406 (e.g., at a second cosine signal line, without limitation). The arrows illustrated on FIG. 4A illustrate the continuous path 402 and a direction of continuous path 402. Cosine coil 108 may be configured such that an electrical current may traverse the continuous path 402. For example, an excitation signal at an oscillating coil (e.g., oscillator coil 104 of FIG. 1A, FIG. 1B, FIG. 2A, FIG. 2B, and FIG. 2C) may cause an oscillating cosine sense signal at cosine coil 108. Between one time and a next time, i.e., during a first half of a cycle, the oscillating current may flow on the continuous path 402 of cosine coil 108 in the direction illustrated by the arrows of FIG. 4A. According to the oscillation of the excitation signal, and the oscillation of the voltage generated in cosine coil 108, current may also traverse the continuous path 402 in the reverse direction, i.e., during a second half of the cycle. However, for descriptive purposes, in the present disclosure, the path will be described as having a direction, i.e., between first location 404 and second location 406.

Similar to what was described with regard to sine coil 106 of FIG. 3, the continuous path 402 may include a first path portion 408, illustrated using dash-dotted-line arrows and a second path portion 410, illustrated using dashed-line arrows. First path portion 408 may be defined by the direction of first path portion 408 being generally counter-clockwise around a geometric center 412 of the continuous path 402 and second path portion 410 may be defined by the direction of second path portion 410 being generally clockwise around geometric center 412.

However, despite the shape of sine coil 106 of FIG. 3 being similar to the shape of cosine coil 108, the shape of first path portion 408 and second path portion 410 of FIG. 4A may be different than the shape of first path portion 308 and second path portion 310 of FIG. 3. The shape of first path portion 408 is illustrated in FIG. 4B. The shape of second path portion 410 is illustrated in FIG. 4C. First path portion 408 includes lobe 422, lobe 424, corner region 426, and inter-lobe region 438. Similarly, second path portion 410 includes lobe 428, lobe 430, corner region 432, and inter-lobe region 440.

The continuous path 402 includes coupling region 416 at which first path portion 408 may be configured to redirect flow of electrical current onto second path portion 410 and second path portion 410 may be configured to redirect flow of electrical current onto first path portion 408. Coupling region 416 may include inter-lobe region 438 of first path portion 408 and corner region 432 of second path portion 410. Thus, a flow of electrical current may be redirected from the pair of lines surrounding white space at inter-lobe region 438 of FIG. 4B to the pair of lines surrounding white space at corner region 432 of FIG. 4C according to the direction of the continuous path 402. And, a flow of electrical current may be redirected from the solid thick line at corner region 432 of FIG. 4C to the solid thick line at inter-lobe region 438 of FIG. 4B according to the direction of the continuous path 402.

At a radial-direction-reversal region 414, first path portion 408 changes from being defined as a generally outward path away from geometric center 412 to being defined as a generally inward path toward geometric center 412. Likewise, at radial-direction-reversal region 414, second path portion 410 changes from being defined as a generally inward path toward geometric center 412 to being defined as a generally outward path away from geometric center 412. Radial-direction-reversal region 414 includes corner region 426 of first path portion 408 and inter-lobe region 440 of second path portion 410. The change in direction of first path portion 408 and second path portion 410 at radial-direction-reversal region 414 may result in a phase shift of a modulating signal modulating the cosine sense signal when the target passes over radial-direction-reversal region 414. Further description of the phase shift is provided below with regard to FIG. 6.

Radial-direction-reversal region 414, coupling region 416, and geometric center 412 may be arranged on a common plane, e.g., a plane perpendicular to a plane of the continuous path, without limitation. Not considering the z-dimension (i.e., treating cosine coil 108 as if it were all on the same x-y plane), radial-direction-reversal region 414, coupling region 416, and geometric center 412 may be on a line 436, e.g., a line parallel to a plane of the continuous path, without limitation. Further, radial-direction-reversal region 414 and coupling region 416 may be the same distance 434 from geometric center 412.

The continuous path 402 also includes a first crossover region 418 and a second crossover region 420, at which one of first path portion 408 or second path portion 410 may be over the other of first path portion 408 and second path portion 410.

FIG. 12 is a perspective view of another example sense coil of a rotational-position sensor according to one or more examples. In particular, FIG. 12 illustrates cosine coil 108. The perspective view of FIG. 12 was selected to illustrate that at coupling region 416, first path portion 408, at a higher x-y plane, redirects current onto second path portion 410 at the higher x-y plane and at coupling region 416, second path portion 410, at a lower x-y plane, redirects current onto first path portion 408 at the lower x-y plane. Additionally, the perspective of FIG. 12 was selected to illustrate that at radial-direction-reversal region 414, first path portion 408, at a lower x-y plane, redirects current from generally radially outward, away from the geometric center, to generally radially inward, toward the geometric center and at radial-direction-reversal region 414, second path portion 410, at a higher x-y plane, redirects current from generally radially inward, toward the geometric center, to generally radially outward, away from the geometric center. Also illustrated in FIG. 12 are first crossover region 418 and second crossover region 420, at which, in contrast to radial-direction-reversal region 414 coupling region 416, the direction of a flow of current remains generally the same e.g., as a portion of the first path portion 408 passes over the second path portion 410 or vice versa.

FIG. 5 is a diagram illustrating a top view of two example sense coils of a rotational-position sensor according to one or more examples. In particular, FIG. 5 illustrates sine coil 106 and cosine coil 108.

FIG. 13 is a perspective view of two example sense coils of a rotational-position sensor according to one or more examples. In particular, FIG. 13 illustrates sine coil 106 and cosine coil 108.

FIG. 10 includes two graphs illustrating simulated modulated signals according to one or more examples. In particular, FIG. 10 illustrates sine signal 1002 which may be a sine signal at a sine coil 106 of FIG. 1A, FIG. 1B, FIG. 2A, FIG. 2B, and FIG. 3 and a cosine signal 1004 which may be a cosine signal at a cosine coil 108 of FIG. 1A, FIG. 1B, FIG. 2A, FIG. 2C, and FIG. 4A. The carrier frequency illustrated in FIG. 10 was intentionally selected to be near the order of magnitude of the rotational frequency of the target to illustrate that the sine signal 1002 and the cosine signal 1004 are modulated signals. In various examples, the carrier frequency of the sine signal 1002 and the cosine signal 1004 may be 1 MHz to 6 MHz, as a non-limiting example which may be orders of magnitude greater than the rotational frequency of the target.

FIG. 6 is a graph illustrating example simulated demodulated signals according to one or more examples. In particular, FIG. 6 illustrates demodulated sine signal 602 and demodulated cosine signal 604. Each of demodulated sine signal 602 and demodulated cosine signal 604 may be an output of an IC (e.g., IC 112 of FIG. 1A, FIG. 1B, FIG. 2A, FIG. 2B, and FIG. 2C, without limitation), in various examples. In particular, IC 112 may be configured to demodulate a first sense signal from a first sense coil (e.g., a sense coil designated as a "cosine" coil, without limitation) to produce demodulated cosine signal 604 and to demodulate a second sense signal from a second sense coil (e.g., a sense coil designated as a "sine" coil, without limitation) to produce demodulated sine signal 602. Each of demodulated sine signal 602 and demodulated cosine signal 604 have a voltage amplitude over a range of motion of a target rotating around an axis (e.g., rotating from 0° to 360°). Demodulated sine signal 602 may be indicative of a degree to which the target affected the magnetic field between the oscillating coil and the sine coil as the target rotated around the axis. Demodulated cosine signal 604 may be indicative of a degree to which the target affected the magnetic field between the oscillating coil and the cosine coil as the target rotated around the axis.

In other words, for each rotational position of the target (e.g., target 114, without limitation) above sense coils (e.g., sine coil 106 and cosine coil 108, without limitation), there may be a voltage amplitude for the demodulated sine signal 602 and a voltage amplitude for the demodulated cosine signal 604. The voltage amplitudes of the demodulated sine signal 602 and the demodulated cosine signal 604 at a single rotational position are independent of the rotational direction of the target. Thus, whether the target was rotated clockwise or counter-clockwise to arrive at a rotational position, while the target is at the rotational position, the voltage amplitudes of the demodulated sine signal 602 and the demodulated cosine signal 604 will be the same. However a rotational direction may be determined from successive samples of the voltage amplitudes of the demodulated sine signal 602 and the demodulated cosine signal 604. Thus, while the target is rotating to the rotational position, it may be determined whether the target is rotating in a clockwise or counter-clockwise direction.

Demodulated sine signal 602 exhibits a continuous phase signal 608, i.e., without abrupt phase shifts, at least in part because sine coil 106 does not include a radial-direction-reversal region. In contrast, demodulated cosine signal 604 exhibits a 180°-phase shift 606 at 180° of target rotation. In other words, as the target passes over the 180° rotation point, the phase of demodulated cosine signal 604 shifts by 180°. The 180° rotation point corresponds to radial-direction-reversal region 414 of FIG. 4A. At radial-direction-reversal region 414, the cosine sense signal changes polarity by changing direction of the flow of current, i.e., to/from a generally inward path from/to a generally outward path in relation to a geometric center. As a simplified example provided for explanatory purposes, because of the shape of the second sense coil (e.g., sine coil 106 of FIG. 1A, FIG. 2A, FIG. 2B, and FIG. 3) the demodulated second signal (e.g., demodulated sine signal 602 of FIG. 6) describes a cyclic pattern as the target (e.g., target 114 of FIG. 1A and FIG. 1B) rotates around the axis of rotation (e.g., axis 116 of FIG. 1A and FIG. 1B). If the first sense coil that generated the first sense signal were the same as the second sense coil, the demodulated first sense signal would be the same (though out of phase by 90° because of rotation of the first sense coil relative to the second sense coil) as the second demodulated sense signal. However, because the first sense coil (e.g., cosine coil 108 of FIG. 1A, FIG. 2A, FIG. 2C, and FIG. 4A) includes a change in direction (e.g., radial-direction-reversal region 414 of FIG. 4A), the demodulated first sense signal is different from the demodulated second sense signal. In particular, because the current changes direction at the radial-direction-reversal region, the demodulated first sense signal changes phase by 180° halfway through the cycle (e.g., as the target rotates over 180°). A 180° degree phase change in a cosine signal is equivalent to a reversal of polarity of the cosine signal.

An IC (e.g., IC 112 of FIG. 1A, FIG. 1B, FIG. 2A, FIG. 2B, and FIG. 2C, without limitation) may be configured to generate each of demodulated sine signal 602 and demodulated cosine signal 604 in response to receiving sense signals from sense coils according to this disclosure. In particular, the IC may be configured to generate demodulated sine signal 602 in response to receiving a sense signal from sine coil 106 of FIG. 3, and to generate demodulated cosine signal 604 in response to receiving a sense signal from cosine coil 108 of FIG. 4A.

FIG. 7 is a graph illustrating an example simulated output signal according to one or more examples. In particular, FIG. 7 illustrates output signal 702. Output signal 702 may be an output of an IC (e.g., IC 112 of FIG. 1A, FIG. 1B, FIG. 2A, FIG. 2B, and FIG. 2C, without limitation), in various examples. In particular, IC 112 may be configured to receive a second sense signal from a second sense coil (e.g., a sense coil designated as a "sine" coil, without limitation) and a first sense signal from a first sense coil (e.g., a sense coil designated as a "cosine" coil, without limitation) and produce output signal 702 based on the first sense signal and the second sense signal. As a non-limiting example, the IC may be configured to demodulate the first sense signal and the second sense signal (sine signal 602 of FIG. 6 may be an example of the demodulated second sense signal and cosine signal 604 of FIG. 6 may be an example of the demodulated first sense signal). The IC may further be configured to calculate the position information by calculating the arctangent of the demodulated second sense signal and the demodulated first sense signal (i.e., A tan 2(demodulated second sense signal, demodulated first sense signal)). Additionally, in various examples, the IC may be configured to adjust the position information using a linearization algorithm.

Output signal 702 has an amplitude that is a percentage of a rail voltage (VCC) over a range of motion of a target rotating around an axis (e.g., rotating from 0° to 360°). As with the demodulated sine signal 602 and the demodulated cosine signal 604 of FIG. 6, for each rotational position of the target (e.g., target 114, without limitation) above sense coils (e.g., sine coil 106 and cosine coil 108, without limitation), the output signal 702 has an amplitude. The amplitude of the output signal 702 is independent of the rotational direction of the target. Thus, whether the target was rotated clockwise or counter-clockwise to arrive at a rotational position, at the rotational position the amplitude of the output signal 702 will be the same. However a rotational direction may be determined from successive samples of the amplitude of the output signal 702. Thus, while the target is rotating to the rotational position, it may be determined whether the target is rotating in a clockwise or counter-clockwise direction. For example, a clockwise rotation from 90° to 180° at a first rotational speed may result in an output signal 702 over time slope that is opposite that of a counter-clockwise rotation at the rotational speed from 90° to 0°. Additionally, the shape of the output signal 702 is symmetric about the 180° rotational position; i.e., the amplitude of the output signal is the same for any rotational position and 360° minus that rotational position (e.g., f(x°)=f(360°−x°)). So, a full rotation, from 0° to 360° in a clockwise direction will have the same output signal 702 over time as a full rotation from 360° to 0° in the counter-clockwise direction.

Output signal 702 is an example of a dual-slope output signal because output signal 702 includes a first slope 704 corresponding to the target rotating through a first range of target positions (e.g., 0° to 180°, without limitation) and a second slope 708 corresponding to the target rotating through a second range of target positions (e.g., 180° to 360°, without limitation). Additionally, output signal 702 includes a first plateau 706 between the first slope 704 and the second slope 708 and a second plateau 710 between the second slope 708 and a successive first slope (not illustrated). Output signal 702 may define a waveform 712. For example, while the target continuously rotates around the axis at a constant rotational rate, the waveform 712 may repeat.

An IC (e.g., IC 112 of FIG. 1A, FIG. 1B, FIG. 2A, FIG. 2B, and FIG. 2C, without limitation) may be configured to generate output signal 702 in response to receiving sense signals from sense coils according to this disclosure. In particular, the IC may be configured to generate output signal 702 in response to receiving a sense signal from sine coil 106 of FIG. 3 and cosine coil 108 of FIG. 4A. The 180°-phase shift at 180° of target rotation (e.g., as described with regard to FIG. 6) causes the dual-slope nature of output signal 702. As a simplified example provided for explanatory purposes, by reversing the polarity of the cosine signal halfway through the cycle (e.g., at 180° target rotation), the slope of the output signal (e.g., the arctangent of the demodulated first sense signal and the demodulated second sense signal) is reversed halfway through the cycle.

FIG. 8 is a diagram illustrating a top view of another example rotational-position sensor 800 according to one or more examples. Rotational-position sensor 800 may be the same as or substantially similar to rotational-position sensor 100 of FIG. 1A and FIG. 1B in many respects. In particular, the shape and operation of the sense coils and the oscillating coil may be the same.

One difference between rotational-position sensor 800 and rotational-position sensor 100 is that target 802 may be configured to be over more of one or both of the sense coils and the oscillating coil than target 114 of FIG. 1A and FIG. 1B. Target 114 may be configured to be over a majority of one lobe of one of the sense coils. As a non-limiting example, for sense coils including four radially symmetric sense coils (e.g., as illustrated in FIG. 2A, FIG. 2B, and FIG. 2C, without limitation), target 114 may be configured to be over 45° of a circle centered at the geometric center of the sense coils and or oscillating coil. Target 802 may be configured to be over a majority of all but one lobe of one of the sense coils. As a non-limiting example, for sense coils including four radially symmetric sense coils (e.g., as illustrated in FIG. 2A, FIG. 2B, and FIG. 2C, without limitation), target 802 may be configured to be over 270° to 359° of a circle centered at the geometric center of the sense coils and or oscillating coil. As a specific, non-limiting example, target 114 may be arranged to cover 315° of a circle centered at axis 116.

A target that is over more of one or both of the sense coils and the oscillating coil (e.g., target 802, without limitation) may disturb more of the magnetic field between the oscillating coil and the sense coils than a target that is over less of one or both of the sense coils and the oscillating coil (e.g., target 114, without limitation). Thus, target 802, when positioned farther from the sense coils, may affect the currents induced at the sense coils as much as target 114 when positioned closer to the sense coils. Thus, target 802 may allow for a larger airgap between the target and the sense coils than target 114. In some instances, a larger airgap may be desirable to provide, for example, greater manufacturing tolerances, without limitation.

FIG. 9 illustrates a method 900 for rotational-position sensing according to one or more examples. Method 900 may be performed at one or more of rotational-position sensor 100 of FIG. 1A and FIG. 1B and rotational-position sensor 200 of FIG. 2A, FIG. 2B, and FIG. 2C.

At block 902, an oscillatory coil may be excited with an oscillating signal.

At block 904, a first sense signal induced at a first sense coil may be received. The first sense signal may exhibit modulation responsive to a rotation of a target relative to the first sense coil. The first sense signal may exhibit a 180°-phase change responsive to the target rotating over a radial-direction-reversal region of the first sense coil. The cosine coil 108 of FIG. 1A, FIG. 2A, FIG. 2C, and FIG. 4A may be an example of the first sense coil. The cosine signal 1004 of FIG. 10 may be an example of the first sense signal.

At block 906, which is optional, a second sense signal induced at a second sense coil may be received. The second sense signal may exhibit modulation responsive to the target rotating. The sine coil 106 of FIG. 1A, FIG. 2A, FIG. 2B, and FIG. 3 may be an example of the second sense coil. The sine signal 1002 of FIG. 10 may be an example of the second sense signal.

At block 908, which is optional, a first output signal derived from the first sense signal may be generated. The first output signal may exhibit a 180°-phase change responsive to the target rotating over a radial-direction-reversal region of the first sense coil. The cosine signal 604 of FIG. 6 may be an example of the first output signal.

At block 910, which is optional, a second output signal derived from the second sense signal may be generated. The sine signal 602 of FIG. 6 may be an example of the second output signal.

At block 912, which is optional, a resultant output responsive to the first sense signal and the second sense signal may be generated. The resultant output may exhibit a first slope before the target passes over the radial-direction-reversal region while the target rotates in a direction and a second slope after the target passes over the radial-direction-reversal region while the target rotates in the direction. The output signal 702, including the first slope 704 and the second slope 708, of FIG. 7 may be an example of the resultant output.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In various examples, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different sub-combinations of some of the elements. For example, the phrase "A, B, C, D, or combinations thereof" may refer to any one of A, B, C, or D; the combination of each of A, B, C, and D; and any sub-combination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additional non-limiting examples of the disclosure may include:

Example 1. An apparatus, comprising: a support structure; and an electrically conductive material the electrically conductive material arranged at the support structure to define a continuous path for electrical current to flow between a first location and a second location, the continuous path comprising: a first path portion defined as a generally clockwise path for the electrical current to flow around a geometric center of the continuous path; a second path portion defined as a generally counter-clockwise path for the electrical current to flow around the geometric center; and a crossover region at which one of the first path portion or the second path portion changes from being defined as a generally outward path for the electrical current to flow away from the geometric center to being defined as a generally inward path for the electrical current to flow toward the geometric center.

Example 2. The apparatus according to Example 1, wherein, at the crossover region, the other of the first path portion or the second path portion changes from being defined as a generally inward path for the electrical current to flow toward the geometric center to being defined as a generally outward path for the electrical current to flow away from the geometric center.

Example 3. The apparatus according to any of Examples 1 through 2, wherein each of the first path portion and the second path portion define two lobes and a corner, wherein the crossover region is at a corner of the one of the first path portion or the second path portion, and wherein the crossover region is between the two lobes of the other of the first path portion or the second path portion.

Example 4. The apparatus according to any of Examples 1 through 3, wherein the continuous path comprises a first and a second coupling path portions that respectively couple the first path portion and the second path portion.

Example 5. The apparatus according to Example 4, wherein the first coupling path portion is configured to redirect flow of the electrical current from the first path portion to the second path portion, and the second coupling portion is configured to redirect flow of the electrical current from the second path portion to the first path portion.

Example 6. The apparatus according to any of Examples 4 through 5, wherein all of the crossover region, the geometric center, and the first and second coupling path portions are in a plane perpendicular to a plane of the continuous path.

Example 7. The apparatus according to any of Examples 4 through 6, wherein the crossover region is a distance from the geometric center and wherein the first and second coupling path portions are the distance from the geometric center.

Example 8. The apparatus according to any of Examples 4 through 7, wherein the first and second coupling path portions are at a location, wherein each of the first path portion and the second path portion define two lobes and a corner, wherein the location is between the two lobes of the one of the first path portion or the second path portion, and wherein the location is at a corner of the other of the first path portion or the second path portion.

Example 9. The apparatus according to any of Examples 1 through 8, wherein, at a second crossover region, the first path portion is above the second path portion and, at a third crossover region, the second path portion is above the first path portion.

Example 10. A rotational-position sensor, comprising a sense coil including a first sense coil portion and a second sense coil portion; an oscillator coil arranged around the sense coil, wherein when an excitation signal is carried by the oscillator coil, a magnetic coupling is formed between a sense signal carried at the sense coil and the excitation signal; a target arranged to rotate about an axis of rotation perpendicular to a plane of the sense coil and to influence a degree of the magnetic coupling between the excitation signal and the sense signal, wherein the sense signal is modulated by a change in the degree of the magnetic coupling responsive to the rotation of the target; and an integrated circuit configured to generate an output signal responsive to a modulated sense signal, wherein respective geometries of the first sense coil portion and the second sense coil portion are configured such that the output signal is characterized by a waveform that, in response to a full rotation of the target in a clockwise direction, generally decreases, plateaus and then generally increases, and in response to a full rotation of the target in a counter-clockwise direction opposite the first direction, generally decreases, plateaus, and then generally increases.

Example 11. The rotational-position sensor according to Example 10, wherein the waveform has a first slope responsive to the target rotating in a rotational direction between 0° and 180° around the axis of rotation and the waveform has a second slope responsive to the target rotating in the rotational direction between 180° and 360° around the axis of rotation.

Example 12. The rotational-position sensor according to any of Examples 10 through 11, wherein the first slope is opposite the second slope.

Example 13. The rotational-position sensor according to any of Examples 10 through 12, wherein the rotational direction is a first rotational direction, wherein the waveform has the first slope responsive to the target rotating in a second rotational direction between 360° and 180° around the axis of rotation and the waveform has the second slope responsive to the target rotating in the second rotational direction between 180° and 0° around the axis of rotation.

Example 14. The rotational-position sensor according to any of Examples 10 through 13, wherein the sense coil comprises a first sense coil, wherein the sense signal comprises a first sense signal, wherein the rotational-position sensor further comprises a second sense coil arranged within the oscillator coil such that, when the excitation signal is carried by the oscillator coil, a second sense signal is induced at the second sense coil, wherein the second sense coil is arranged below the target such that, in response to the rotation of the target, the second sense signal is modulated, and wherein the integrated circuit is configured to generate the output signal further responsive to the modulated second sense signal.

Example 15. The rotational-position sensor according to any of Examples 10 through 14, wherein the excitation signal is an oscillating signal with a frequency of between 1 megahertz and 6 megahertz.

Example 16. A rotational-position sensor comprising: a target; and a sense coil arranged relative to the target, the sense coil configured to provide a modulated signal responsive to the target rotating around an axis of rotation, wherein the modulated signal changes phase by 180° responsive to the target rotating over a crossover point of the sense coil.

Example 17. The rotational-position sensor according to Examples 16, comprising an oscillator coil arranged around the sense coil such that, when an excitation signal is carried by the oscillator coil around the sense coil, a sense signal is generated at the sense coil, wherein the sense signal is modulated responsive to the target rotating around the axis.

Example 18. The rotational-position sensor according to any of Examples 16 through 17, wherein the target is arranged to affect magnetic coupling between the oscillator coil and the sense coil.

Example 19. The rotational-position according to any of Examples 16 through 18, wherein the target comprises a non-ferromagnetic material.

Example 20. The rotational-position sensor according to any of Examples 16 through 19, wherein the target is substantially over 45° of a circle having a center at the axis of rotation.

Example 21. The rotational-position sensor according to any of Examples 16 through 19, wherein the target is substantially over 315° of a circle having a center at the axis of rotation.

Example 22. The rotational-position sensor according to any of Examples 16 through 21, wherein the sense coil comprises a first sense coil, wherein the modulated signal comprises a first modulated signal, wherein the rotational-position sensor further comprises a second sense coil, wherein responsive to the target rotating around the axis, a second modulated signal is generated at the second sense coil.

Example 23. The rotational-position sensor according to Examples 22, wherein responsive to a unidirectional rotation of the target around the axis, the second sense coil is configured to generate the second modulated signal exhibiting a continuous-phase signal.

Example 24. The rotational-position sensor according to any of Examples 16 through 23, comprising an integrated circuit configured to generate an output responsive to the modulated signal.

Example 25. The rotational-position sensor according to Example 24, wherein responsive to a full rotation of the target around the axis, the integrated circuit is configured to generate an output having a first slope and a second slope.

Example 26. The rotational-position sensor according to Example 25, wherein the output has the first slope responsive to the target rotating in a rotational direction between a point opposite the crossover point and the crossover point and the output has the second slope responsive to the target rotating in the rotational direction between the crossover point and the point.

Example 27. A method comprising: exciting an oscillatory coil with an oscillating signal; and measuring a signal induced at a sense coil, the signal exhibiting modulation responsive to a rotation of a target relative to the sense coil, the signal exhibiting a 180°-phase change responsive to the target rotating over a crossover point of the sense coil.

Example 28. The method according to Example 27, wherein the signal is a first signal, the method comprising measuring a second signal induced at a second coil, the second signal exhibiting modulation responsive to the target rotating.

Example 29. The method according to any of Examples 27 through 28, comprising: generating a first output signal derived from the first signal, the first output signal exhibiting a 180°-phase change responsive to the target rotating over a crossover point of the sense coil; and generating a second output signal derived from the second signal.

Example 30. The method according to any of Examples 27 through 29, comprising generating an output responsive to the signal, the output exhibiting a first slope before the target passes over the crossover point and a second slope after the target passes over the crossover point.

Example 31. A rotational-position sensor comprising: a first sense coil defining a first path around an axis, the first path including first four lobes; a second sense coil defining a second path around the axis, the second path including second four lobes; and a target configured to rotate around the axis, the target configured to be over all but half of a lobe of each of the first four lobes and the second four lobes.

Example 32. The rotational-position sensor according to Example 31, wherein the first four lobes are radially evenly spaced, wherein the second four lobes are radially evenly spaced, and wherein the target extends over 315° of a circle centered at a geometric center of the first path.

Example 33. The rotational-position sensor according to any of Examples 31 through 32, comprising an oscillator coil surrounding the first sense coil and the second sense coil, wherein the target is configured to be over 315°-worth of the oscillator coil.

Example 34. An apparatus comprising: a rotational-position sensor that is configured to sense a signal that exhibits amplitude modulation as a target rotates around an axis of rotation above a sense coil, the amplitude modulation comprising two sinusoidal cycles per target rotation, the amplitude modulation exhibiting a 180°-phase shift responsive to the target rotating over a crossover point of the sense coil.

While the present disclosure has been described herein with respect to certain illustrated examples, those of ordinary skill in the art will recognize and appreciate that the present invention is not so limited. Rather, many additions, deletions, and modifications to the illustrated and described examples may be made without departing from the scope of the invention as hereinafter claimed along with their legal equivalents. In addition, features from one example may be combined with features of another example while still being encompassed within the scope of the invention as contemplated by the inventor.

What is claimed is:

1. An apparatus, comprising:
   a support structure; and
   an electrically conductive material arranged at the support structure to define a continuous path for electrical current to flow between a first location and a second location, the continuous path comprising:
      a first path portion defined as a generally clockwise path for the electrical current to flow around a geometric center of the continuous path;
      a second path portion defined as a generally counter-clockwise path for the electrical current to flow around the geometric center;
      the first path portion and the second path portion together defining at least a first lobe and a second lobe, the second lobe adjacent and meeting with the first lobe at an inter-lobe region; and
      the inter-lobe region having a radial-direction-reversal region at which one of the first path portion or the second path portion defined as the one of the generally clockwise path or the generally counter-clockwise path changes from being defined as a generally outward path along a portion of the first lobe for the electrical current to flow away from the geometric center to being defined as a generally inward path along a portion of the second lobe for the electrical current to flow toward the geometric center in the same one of the generally clockwise path or the generally counter-clockwise path.

2. The apparatus of claim 1, wherein, at the radial-direction-reversal region, the other one of the first path portion or the second path portion defined as the other one of the generally clockwise path or the generally counter-clockwise path changes from being defined as a generally inward path along a portion of the first lobe for the electrical current to flow toward the geometric center to being defined as a generally outward path along a portion of the second lobe for the electrical current to flow away from the geometric center in the same other one of the generally clockwise path or the generally counter-clockwise path.

3. The apparatus of claim 1, wherein each of the first path portion and the second path portion define two respective lobe portions and a respective corner region, wherein the radial-direction-reversal region is at a corner region of the one of the first path portion or the second path portion, and wherein the radial-direction-reversal region is between the two lobe portions of the other of the first path portion or the second path portion.

4. The apparatus of claim 1, wherein the continuous path comprises a coupling region that respectively couples the first path portion and the second path portion.

5. The apparatus of claim 4, wherein at the coupling region flow of the electrical current from the first path portion is redirected to the second path portion, and at the coupling region the electrical current from the second path portion is redirected to the first path portion.

6. The apparatus of claim 4, wherein the radial-direction-reversal region, the geometric center, and the coupling region are located along a line parallel to a plane of the continuous path.

7. The apparatus of claim 6, wherein the radial-direction-reversal region is located at a distance from the geometric center and wherein the coupling region is located at the same distance from the geometric center.

8. The apparatus of claim 4, wherein each of the first path portion and the second path portion define two respective lobe portions and a respective corner region, wherein the coupling region is between the two lobe portions of the one of the first path portion or the second path portion, and wherein the coupling region is at the corner region of the other of the first path portion or the second path portion.

9. The apparatus of claim 1, wherein, at a first crossover region, the first path portion is above the second path portion and, at a second crossover region, the second path portion is above the first path portion.

10. A rotational-position sensor, comprising:
a sense coil defining a continuous path for electrical current to flow between a first location and a second location, the continuous path comprising:
  a first sense coil portion defined by a generally clockwise path for the electrical current to flow around an axis of rotation for a target;
  a second sense coil portion defined by a generally counter-clockwise path for the electrical current to flow around the axis of rotation;
  the first sense coil portion and the second sense coil portion together defining at least a first lobe and a second lobe, the second lobe adjacent and meeting with the first lobe at an inter-lobe region;
  the inter-lobe region having a radial-direction-reversal region at which one of the first sense coil portion or the second sense coil portion defined as one of the generally clockwise path or the generally counter-clockwise path changes from being a generally outward path along a portion of the first lobe for the electrical current to flow away from the axis of rotation to a generally inward path along a portion of the second lobe for the electrical current to flow toward the axis of rotation in the same one of the generally clockwise path or the generally counter-clockwise path;
an oscillator coil arranged around the sense coil, wherein when an excitation signal is carried by the oscillator coil, a magnetic coupling is formed between a sense signal carried at the sense coil and the excitation signal;
the target arranged to rotate about the axis of rotation perpendicular to a plane of the sense coil and to influence a degree of magnetic coupling between the excitation signal and the sense signal, wherein the sense signal is modulated by a change in the degree of magnetic coupling responsive to the rotation of the target to generate a modulated sense signal; and
an integrated circuit to generate an output signal responsive to the modulated sense signal,
wherein respective geometries of the first sense coil portion and the second sense coil portion are such that the output signal is characterized by a waveform that, in response to a full rotation of the target in a clockwise direction, generally decreases, plateaus and then generally increases, and in response to a full rotation of the target in a counter-clockwise direction, generally decreases, plateaus, and then generally increases.

11. The rotational-position sensor of claim 10, wherein the waveform has a first slope responsive to the target rotating in the clockwise direction between 0° and 180° around the axis of rotation and the waveform has a second slope responsive to the target rotating in the clockwise direction between 180° and 360° around the axis of rotation.

12. The rotational-position sensor of claim 11, wherein the first slope is opposite the second slope.

13. The rotational-position sensor of claim 11, wherein the waveform has the first slope responsive to the target rotating in the counter-clockwise direction between 360° and 180° around the axis of rotation and the waveform has the second slope responsive to the target rotating in the counter-clockwise direction between 180° and 0° around the axis of rotation.

14. The rotational-position sensor of claim 10, wherein the sense coil comprises a cosine coil, wherein the sense signal comprises a cosine sense signal, wherein the rotational-position sensor further comprises a sine coil arranged within the oscillator coil such that, when the excitation signal is carried by the oscillator coil, a sine sense signal is induced at the sine coil, wherein the sine coil is arranged below the target such that, in response to the rotation of the target, the sine sense signal is modulated, and wherein the integrated circuit to generate the output signal further responsive to the modulated sine sense signal.

15. A method comprising:
exciting an oscillatory coil with an oscillating signal; and
receiving a signal induced at a sense coil which defines a continuous path for electrical current to flow between a first location and a second location, the continuous path comprising:
  a first path portion defined as a generally clockwise path for the electrical current to flow around a geometric center of the continuous path;
  a second path portion defined as a generally counter-clockwise path for the electrical current to flow around the geometric center;
  the first path portion and the second path portion together defining at least a first lobe and a second lobe, the second lobe adjacent and meeting with the first lobe at an inter-lobe region; and
  the inter-lobe region having a radial-direction-reversal region at which one of the first path portion or the second path portion defined as one of the generally clockwise path or the generally counter-clockwise path changes from being a generally outward path along a portion of the first lobe for the electrical current to flow away from the geometric center to being a generally inward path along a portion of the second lobe for the electrical current to flow toward the geometric center in the same one of the generally clockwise path or the generally counter-clockwise path,
the signal exhibiting modulation responsive to a rotation of a target relative to the sense coil, the signal exhibiting a 180°-phase change responsive to the target rotating over the radial-direction-reversal region of the sense coil.

16. The method of claim 15, wherein the sense coil is a cosine coil, wherein the signal is a cosine sense signal, the method comprising receiving a sine sense signal induced at a sine coil, the sine sense signal exhibiting modulation responsive to the target rotating.

17. The method of claim 16, comprising:
generating a first output signal derived from the cosine sense signal, the first output signal exhibiting a 180°-phase change responsive to the target rotating over the radial-direction-reversal region of the sense coil; and
generating a second output signal derived from the sine sense signal.

18. The method of claim 15, comprising generating a resultant output responsive to the signal, the resultant output exhibiting a first slope before the target passes over the radial-direction-reversal region and a second slope after the target passes over the radial-direction-reversal region.

19. A rotational-position sensor comprising:
- a first sense coil defining a first continuous path around an axis, the first continuous path including four respective lobes;
- a second sense coil defining a second continuous path around the axis, the second continuous path including four respective lobes;
- respective ones of the first continuous path and the second continuous path for electrical current to flow between a first location and a second location, the respective ones of the first continuous path and the second continuous path comprising:
  - a first path portion defined as a generally clockwise path for the electrical current to flow around the axis;
  - a second path portion defined as a generally counter-clockwise path for the electrical current to flow around the axis;
  - the first path portion and the second path portion together defining at least a first lobe and a second lobe, the second lobe adjacent and meeting with the first lobe at an inter-lobe region; and
  - the inter-lobe region having a radial-direction-reversal region at which one of the first path portion or the second path portion changes from being a generally outward path along a portion of the first lobe for the electrical current to flow away from the axis to being a generally inward path along a portion of the second lobe for the electrical current to flow toward the axis in the same one of the generally clockwise path or the generally counter-clockwise path; and
- a target to rotate around the axis, the target to cover all but half of a lobe of the four lobes of the first sense coil and all but half of a lobe of the four lobes of the second sense coil.

20. The rotational-position sensor of claim 19, wherein the four lobes of the first sense coil are radially evenly spaced, wherein the four lobes of the second sense coil are radially evenly spaced, and wherein the target extends over 315° of a circle centered at the axis.

21. The rotational-position sensor of claim 19, comprising an oscillator coil surrounding the first sense coil and the second sense coil, wherein the target is configured to be over a 315° arc of the oscillator coil.

22. An apparatus comprising:
- a rotational-position sensor to sense a signal that exhibits amplitude modulation as a target rotates around an axis of rotation above a sense coil;
- the sense coil defining a continuous path for electrical current to flow between a first location and a second location, the continuous path comprising:
  - a first path portion defined as a generally clockwise path for the electrical current to flow around the axis;
  - a second path portion defined as a generally counter-clockwise path for the electrical current to flow around the axis;
  - the first path portion and the second path portion together defining at least a first lobe and a second lobe, the second lobe adjacent and meeting with the first lobe at an inter-lobe region; and
  - the inter-lobe region having a radial-direction-reversal region at which one of the first path portion or the second path portion changes from a generally outward path along a portion of the first lobe for the electrical current to flow away from the axis to a generally inward path along a portion of the second lobe for the electrical current to flow toward the axis in the same one of the generally clockwise path or the generally counter-clockwise path,
- the amplitude modulation comprising two sinusoidal cycles per target rotation, the amplitude modulation exhibiting a 180°-phase shift responsive to the target rotating over the radial-direction-reversal region of the sense coil.

* * * * *

UNITED STATES PATENT AND TRADEMARK OFFICE
CERTIFICATE OF CORRECTION

PATENT NO. : 11,898,887 B2
APPLICATION NO. : 17/303675
DATED : February 13, 2024
INVENTOR(S) : Ganesh Shaga et al.

Page 1 of 1

It is certified that error appears in the above-identified patent and that said Letters Patent is hereby corrected as shown below:

In the Specification

Column 13, Line 24, change "(i.e., A tan 2(demodulated" to --(i.e., Atan2(demodulated--

Signed and Sealed this
Sixteenth Day of April, 2024

Katherine Kelly Vidal
*Director of the United States Patent and Trademark Office*